(12) United States Patent
Vail et al.

(10) Patent No.: US 9,908,215 B1
(45) Date of Patent: Mar. 6, 2018

(54) SYSTEMS, METHODS AND ASSEMBLIES FOR PROCESSING SUPERABRASIVE MATERIALS

(71) Applicant: US Synthetic Corporation, Orem, UT (US)

(72) Inventors: Michael A. Vail, Genola, UT (US); Heather Marie Schaefer, North Ogden, UT (US); Adam M. Ziegenfelder, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 290 days.

(21) Appl. No.: 14/754,660

(22) Filed: Jun. 29, 2015

Related U.S. Application Data

(60) Provisional application No. 62/036,613, filed on Aug. 12, 2014.

(51) Int. Cl.
| | | |
|---|---|---|
| *E21B 10/40* | (2006.01) | |
| *E21B 10/46* | (2006.01) | |
| *E21B 10/50* | (2006.01) | |
| *E21B 10/567* | (2006.01) | |
| *B24D 3/10* | (2006.01) | |
| *B24D 18/00* | (2006.01) | |

(Continued)

(52) U.S. Cl.
CPC ............... *B24D 3/10* (2013.01); *B01J 19/16* (2013.01); *B01J 19/24* (2013.01); *B24D 18/00* (2013.01); *B01J 2219/00051* (2013.01); *B01J 2219/24* (2013.01)

(58) Field of Classification Search
CPC ........ E21B 10/567; E21B 10/46; E21B 10/50; E21B 10/54
See application file for complete search history.

(56) References Cited

U.S. PATENT DOCUMENTS

| | | | |
|---|---|---|---|
| 3,136,615 A | 6/1964 | Bovernkerk et al. | |
| 3,141,746 A | 7/1964 | De Lai et al. | |

(Continued)

FOREIGN PATENT DOCUMENTS

| | | |
|---|---|---|
| EP | 0196777 | 10/1986 |
| EP | 0300699 | 1/1989 |

(Continued)

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.

(Continued)

*Primary Examiner* — Pegah Parvini
(74) *Attorney, Agent, or Firm* — FisherBroyles, LLP

(57) ABSTRACT

A method of processing a polycrystalline diamond material includes exposing at least a portion of a polycrystalline diamond material to a processing agent for processing at least a portion of the polycrystalline diamond material. The method further includes applying a body force to the volume of processing agent while at least the portion of the polycrystalline diamond material is exposed to the processing agent, and heating at least one of the processing agent and at least the portion of the polycrystalline diamond material exposed to the processing agent during application of the body force to the processing agent.

22 Claims, 13 Drawing Sheets

(51) Int. Cl.
 *B01J 19/24* (2006.01)
 *B01J 19/16* (2006.01)

(56) References Cited

U.S. PATENT DOCUMENTS

| | | |
|---|---|---|
| 3,233,988 A | 2/1966 | Wentorf et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,410,054 A | 10/1983 | Nagel et al. |
| 4,412,980 A | 11/1983 | Tsuji et al. |
| 4,468,138 A | 8/1984 | Nagel |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,731,296 A | 3/1988 | Kikuchi et al. |
| 4,738,322 A | 4/1988 | Hall et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,811,801 A | 3/1989 | Salesky et al. |
| 4,828,582 A | 5/1989 | Frushour |
| 4,844,185 A | 7/1989 | Newton, Jr. et al. |
| 4,854,405 A | 8/1989 | Stroud |
| 4,861,350 A | 8/1989 | Phaal et al. |
| 4,871,377 A | 10/1989 | Frushour |
| 4,899,922 A | 2/1990 | Slutz et al. |
| 4,919,220 A | 2/1990 | Fuller et al. |
| 4,913,247 A | 4/1990 | Jones |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,016,718 A | 5/1991 | Tandberg |
| 5,027,912 A | 7/1991 | Juergens |
| 5,030,276 A | 7/1991 | Sung et al. |
| 5,092,687 A | 3/1992 | Hall |
| 5,096,465 A | 3/1992 | Chen et al. |
| 5,116,568 A | 5/1992 | Sung et al. |
| 5,120,327 A | 6/1992 | Dennis |
| 5,127,923 A | 7/1992 | Bunting et al. |
| 5,135,061 A | 8/1992 | Newton, Jr. |
| 5,154,245 A | 10/1992 | Waldenstrom et al. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,337,844 A | 8/1994 | Tibbitts |
| 5,355,969 A | 10/1994 | Hardy et al. |
| 5,364,192 A | 11/1994 | Damm et al. |
| 5,368,398 A | 11/1994 | Damm et al. |
| 5,370,195 A | 12/1994 | Keshavan et al. |
| 5,379,853 A | 1/1995 | Lockwood et al. |
| 5,439,492 A | 8/1995 | Anthony et al. |
| 5,447,208 A | 9/1995 | Lund et al. |
| 5,460,233 A | 10/1995 | Meany et al. |
| 5,464,068 A | 11/1995 | Najafi-Sani |
| 5,468,268 A | 11/1995 | Tank et al. |
| 5,480,233 A | 1/1996 | Cunningham |
| 5,496,638 A | 3/1996 | Waldenstrom et al. |
| 5,496,639 A | 3/1996 | Connell et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,544,713 A | 8/1996 | Dennis |
| 5,560,716 A | 10/1996 | Tank et al. |
| 5,607,024 A | 3/1997 | Keith et al. |
| 5,620,302 A | 4/1997 | Garrison et al. |
| 5,620,382 A | 4/1997 | Cho et al. |
| 5,624,068 A | 4/1997 | Waldenstrom et al. |
| 5,645,617 A | 7/1997 | Frushor |
| 5,653,300 A | 8/1997 | Lund et al. |
| 5,667,028 A | 9/1997 | Traux et al. |
| 5,718,948 A | 2/1998 | Ederyd et al. |
| 5,722,497 A | 3/1998 | Gum et al. |
| 5,722,499 A | 3/1998 | Nguyen et al. |
| 5,759,216 A | 6/1998 | Kanada et al. |
| 5,776,615 A | 7/1998 | Wong et al. |
| 5,833,021 A | 11/1998 | Mensa-Wilmot et al. |
| 5,875,862 A | 3/1999 | Jurewicz et al. |
| 5,897,942 A | 4/1999 | Karner et al. |
| 5,944,129 A | 8/1999 | Jensen |
| 5,954,147 A | 9/1999 | Overstreet et al. |
| 5,967,250 A | 10/1999 | Lund et al. |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,145,608 A | 11/2000 | Lund et al. |
| 6,193,001 B1 | 2/2001 | Eyre et al. |
| 6,234,261 B1 | 5/2001 | Evans et al. |
| 6,248,447 B1 | 6/2001 | Griffin et al. |
| 6,269,894 B1 | 8/2001 | Griffin |
| 6,290,726 B1 | 9/2001 | Pope et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,528,159 B1 | 3/2003 | Kanada et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope et al. |
| 6,797,326 B2 | 9/2004 | Griffin et al. |
| 6,861,098 B2 | 3/2005 | Griffin et al. |
| 6,878,447 B2 | 4/2005 | Griffin et al. |
| 6,892,836 B1 | 5/2005 | Eyre et al. |
| 6,904,984 B1 | 6/2005 | Estes et al. |

(56) References Cited

U.S. PATENT DOCUMENTS

| | | |
|---|---|---|
| 6,935,444 B2 | 8/2005 | Lund et al. |
| 6,962,214 B2 | 11/2005 | Hughes et al. |
| 6,991,049 B2 | 1/2006 | Eyre et al. |
| 7,350,601 B2 | 4/2008 | Belnap et al. |
| 7,377,341 B2 | 5/2008 | Middlemiss et al. |
| 7,493,973 B2 | 2/2009 | Keshavan |
| 7,506,698 B2 | 3/2009 | Eyre et al. |
| 7,517,589 B2 | 4/2009 | Eyre |
| 7,568,534 B2 | 8/2009 | Griffin et al. |
| 7,608,333 B2 | 10/2009 | Eyre |
| 7,730,977 B2 | 6/2010 | Achilles |
| 7,740,673 B2 | 6/2010 | Eyre |
| 7,754,333 B2 | 7/2010 | Eyre et al. |
| 7,757,785 B2 | 7/2010 | Zhang |
| 7,757,791 B2 | 7/2010 | Belnap |
| 7,866,418 B2 | 1/2011 | Bertagnolli |
| 7,972,395 B1 | 7/2011 | Dadson |
| 8,020,642 B2 | 9/2011 | Lancaster |
| 8,147,572 B2 | 4/2012 | Eyre et al. |
| 8,172,012 B2 | 5/2012 | Achilles |
| 8,297,382 B2 | 10/2012 | Bertagnolli |
| 8,309,050 B2 | 11/2012 | Keshavan |
| 8,323,367 B1 | 11/2012 | Bertagnolli |
| 8,328,891 B2 | 12/2012 | Zhang |
| 8,469,121 B2 | 6/2013 | Lancaster |
| 8,596,387 B1 | 12/2013 | Sani |
| 2005/0115744 A1 | 6/2005 | Griffin et al. |
| 2005/0129950 A1 | 6/2005 | Griffin et al. |
| 2005/0139397 A1 | 6/2005 | Achilles et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060391 A1 | 3/2006 | Eyre et al. |
| 2006/0086540 A1 | 4/2006 | Griffin et al. |
| 2006/0162969 A1 | 7/2006 | Belnap et al. |
| 2006/0266558 A1* | 11/2006 | Middlemiss ............ B22F 7/062 175/426 |
| 2007/0039762 A1 | 2/2007 | Achilles |
| 2007/0181348 A1 | 8/2007 | Lancaster et al. |
| 2007/0187155 A1 | 8/2007 | Middlemiss |
| 2007/0284152 A1* | 12/2007 | Eyre ...................... C22C 26/00 175/405.1 |
| 2009/0152016 A1 | 6/2009 | Eyre et al. |
| 2010/0266816 A1 | 10/2010 | Eyre |
| 2011/0023375 A1 | 2/2011 | Sani |
| 2011/0056141 A1 | 3/2011 | Miess et al. |
| 2012/0247029 A1 | 10/2012 | Eyre |

FOREIGN PATENT DOCUMENTS

| | | | |
|---|---|---|---|
| EP | 0329954 | 8/1989 | |
| EP | 0500253 | 8/1992 | |
| EP | 0585631 | 3/1994 | |
| EP | 0595630 | 5/1994 | |
| EP | 0612868 | 8/1994 | |
| EP | 0617207 | 9/1994 | |
| EP | 0787820 | 8/1997 | |
| EP | 0860515 | 8/1998 | |
| EP | 1190791 | 3/2002 | |
| GB | 1349385 | 4/1974 | |
| GB | 2048927 | 12/1980 | |
| GB | 2268768 | 1/1994 | |
| GB | 2323398 | 9/1998 | |
| GB | 2418215 | 3/2006 | |
| GB | 2422394 | 7/2006 | |
| GB | 2465260 | * 5/2010 | ........... C04B 35/528 |
| JP | 59-35066 | 2/1984 | |
| JP | 61-67740 | 10/1984 | |
| JP | 59-219500 | 12/1984 | |
| JP | 07-62468 | 3/1985 | |
| JP | 61-125739 | 6/1986 | |
| JP | 63-069971 | 9/1986 | |
| JP | 63-55161 | 8/1987 | |
| JP | 07-156003 | 11/1993 | |
| JP | 11-245103 | 9/1999 | |
| JP | 2000-087112 | 3/2000 | |
| RU | 2034937 | 5/1995 | |
| RU | 566439 | 7/2000 | |
| WO | 93/23204 | 11/1993 | |
| WO | 96/34131 | 10/1996 | |
| WO | 00/28106 | 5/2000 | |
| WO | 2004/040095 | 5/2004 | |
| WO | 2004/106003 | 12/2004 | |
| WO | 2004/106004 | 12/2004 | |
| WO | 2012/145586 A1 | 10/2012 | |

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.

* cited by examiner

SYSTEMS, METHODS AND ASSEMBLIES FOR PROCESSING SUPERABRASIVE MATERIALS

CROSS REFERENCE TO RELATED APPLICATION

This application claims priority to U.S. Provisional Application No. 62/036,613, titled "SYSTEMS, METHODS AND ASSEMBLIES FOR PROCESSING SUPERABRASIVE MATERIALS" and filed 12 Aug. 2014, the disclosure of which is incorporated, in its entirety, by this reference.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems.

Conventional superabrasive materials have found utility as superabrasive cutting elements in rotary drill bits, such as roller cone drill bits and fixed-cutter drill bits. A conventional cutting element typically includes a superabrasive layer or table, such as a PCD table. The PCD table is formed and bonded to a substrate using an ultra-high pressure, ultra-high temperature ("HPHT") process. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

Conventional superabrasive materials have also found utility as bearing elements in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Superabrasive elements having a PCD table are typically fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particles may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. In this example, the cobalt acts as a catalyst to facilitate the formation of bonded diamond crystals. Optionally, a metal-solvent catalyst may be mixed with diamond particles prior to subjecting the diamond particles and substrate to the HPHT process. The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst.

In addition to dissolving diamond and graphite, the metal-solvent catalyst may also carry tungsten and/or tungsten carbide from the substrate into the PCD layer. Following HPHT sintering, the tungsten and/or tungsten carbide may remain in interstitial regions defined between the bonded diamond grains.

The presence of the solvent catalyst in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion in the presence of the metal-solvent catalyst. At extremely high temperatures, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

While chemical leaching is effective at removing metal-solvent catalysts from interstitial regions of a PCD layer, the process of chemical leaching is often lengthy, requiring days or weeks to complete in order to achieve a desired leach depth. Additionally, conventional chemical leaching techniques often involve the use of highly concentrated, toxic, and/or corrosive solutions, such as aqua regia and mixtures including hydrofluoric acid (HF), to dissolve and remove metal-solvent catalysts from polycrystalline diamond materials. The use of highly toxic and corrosive leaching agents can present a danger to individuals and may cause significant damage to the substrate over time.

SUMMARY

The instant disclosure is directed to methods, assemblies, and apparatuses for processing polycrystalline diamond materials. In various embodiments, a method of processing a polycrystalline diamond material may comprise exposing at least a portion of a polycrystalline diamond material to a volume of processing agent for processing at least a portion of a catalyst material from interstitial spaces within the polycrystalline diamond material. The processing agent may comprise, for example, a leaching agent for leaching a catalyst material from interstitial spaces within at least the portion of the polycrystalline diamond material. In additional embodiments, the processing agent may comprise a cleaning agent for cleaning the portion of the polycrystalline diamond material. The method may further comprise applying an elevated body force to the volume of processing agent while at least the portion of the polycrystalline diamond material is exposed to the volume of processing agent, and applying a selected temperature to at least one of the volume of processing agent and at least the portion of the polycrystalline diamond material exposed to the volume of processing agent during application of the elevated body force to the volume of processing agent.

In at least one embodiment, the body force may comprise at least one of a gravitational body force and a centrifugal body force. The processing agent may comprise a liquid solution and the elevated body force may comprise a body force sufficient to prevent a phase change of the liquid solution at a selected temperature. The temperature may comprise a temperature greater than or less than a temperature required for a phase change of the liquid solution under atmospheric conditions. In various embodiments, applying the elevated body force may comprise rotating the volume of processing agent and the polycrystalline diamond material about a rotational axis.

In some embodiments, applying the elevated body force may comprise disposing another volume of fluid adjacent to the volume of processing agent. In one example, the other volume of fluid may have a density greater than the density of the processing agent. Additionally, the other volume of fluid may have a height substantially greater than the height of the volume of processing agent. The other volume of fluid may contact the volume of processing agent. The other volume of fluid may also be open to atmospheric surroundings.

In various embodiments, the method may further comprise disposing a barrier around a portion of the polycrystalline diamond material. Also, in various embodiments, the polycrystalline diamond material may comprise a polycrystalline diamond body bonded to a substrate.

In some embodiments, an assembly for processing a polycrystalline diamond body may comprise a processing container and at least one polycrystalline diamond body disposed in the processing container, the at least one polycrystalline diamond body comprising a catalyst material disposed in interstitial spaces within a polycrystalline diamond material. The assembly may also comprise a volume of processing agent disposed in the processing container, at least a portion of the polycrystalline diamond body being exposed to the volume of processing agent. The processing agent may leach at least a portion of the catalyst material from the polycrystalline diamond body. The assembly may further include a body force application portion for applying an elevated body force to the volume of processing agent while at least the portion of the polycrystalline diamond body is exposed to the volume of processing agent, and a heat application element for increasing the temperature to at least one of the volume of processing agent and at least the portion of the polycrystalline diamond body exposed to the volume of processing agent during application of the elevated body force to the volume of processing agent.

In various embodiments, the processing agent may comprise a liquid solution and the elevated body force may be sufficient to prevent a phase change of the liquid solution at the selected temperature. In some embodiments, the body force application portion may comprise a centrifugal device for rotating the processing container about a rotational axis.

In another embodiment, the body force application portion may comprise a fluid conduit containing another volume of fluid disposed gravitationally above the volume of processing agent. The fluid conduit may comprise, for example, a vertical column. The other volume of fluid may have a density greater than the density of the processing agent. Additionally, the other volume of fluid may have a height substantially greater than the height of the volume of the processing agent. In at least one embodiment, an end of the fluid conduit disposed apart from the processing container may comprise an opening such that the other volume of fluid is open to atmospheric surroundings. In at least one embodiment, a protective barrier may be disposed around a portion of the polycrystalline diamond body.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
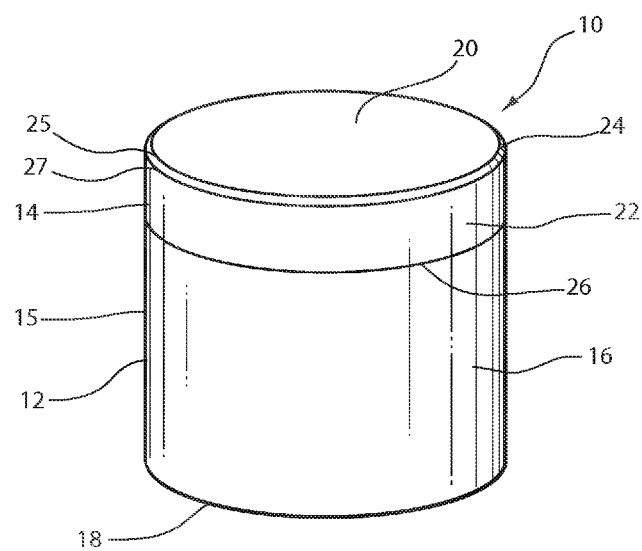
FIG. 1 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to leaching systems, methods and assemblies for processing superabrasive elements, such as superabrasive cutting elements, superabrasive bearings, and superabrasive discs. Such superabrasive elements may be used as cutting elements for use in a variety of applications, such as drilling tools, machining equipment, cutting tools, and other apparatuses, without limitation. Superabrasive elements, as disclosed herein, may also be used as bearing elements in a variety of bearing applications, such as thrust bearings, radial bearings, and other bearing apparatuses, without limitation.

As used herein, the terms "superabrasive" and "superhard" may refer to materials exhibiting a hardness that is at least equal to a hardness of tungsten carbide. For example, a superabrasive article may represent an article of manufacture, at least a portion of which may exhibit a hardness that is equal to or greater than the hardness of tungsten carbide. Additionally, the term "solvent," as used herein, may refer to a single solvent compound, a mixture of two or more solvent compounds, (e.g., an alloy), and/or a mixture of one or more solvent compounds and one or more dissolved compounds. A solvent catalyst may be cobalt, nickel, iron, any Group VIII element, or any alloy or combination thereof. Moreover, the word "cutting" may refer broadly to machining processes, drilling processes, boring processes, or any other material removal process utilizing a cutting element.

FIG. 1 is a perspective view of an exemplary superabrasive element 10 according to at least one embodiment. As illustrated in FIG. 1, superabrasive element 10 may comprise a superabrasive layer or table 14 affixed to or formed upon a substrate 12. Superabrasive table 14 may be affixed to substrate 12 at interface 26, which may be a planar or nonplanar interface. Superabrasive element 10 may comprise a rear surface 18, a superabrasive face 20, and a peripheral surface 15. In some embodiments, peripheral surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of chamfer 24 and superabrasive face 20 and/or at the intersection of chamfer 24 and superabrasive side surface 22. For example, cutting element 10 may comprise one or more cutting edges, such as an edge 25 and/or or an edge 27. Edge 25 and/or or an edge 27 may be formed adjacent to chamfer 24 and may be configured to be exposed to and/or in contact with a mining formation during drilling.

In some embodiments, superabrasive element 10 may be utilized as a cutting element for a drill bit, in which chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as a bearing surface) configured to contact oppositely facing bearing elements.

According to various embodiments, superabrasive element 10 may also comprise a substrate chamfer formed by substrate 12. For example, a chamfer comprising an angular and/or rounded edge may be formed by substrate 12 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Figure 2:
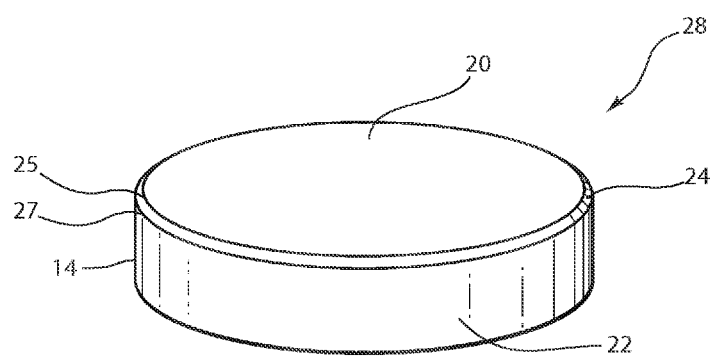
FIG. 2 is a perspective view of an exemplary superabrasive disc according to at least one embodiment.

FIG. 2 is a perspective view of an exemplary superabrasive disc 28 according to at least one embodiment. Superabrasive disc 28 may be formed using any suitable technique. According to some embodiments, superabrasive disc 28 may comprise a PCD superabrasive table 14 fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

In some examples, superabrasive disc 28 may be created by first forming a superabrasive element 10 that includes a substrate 12 and a superabrasive table 14, as detailed above in reference to FIG. 1. Once superabrasive element 10 has been produced, superabrasive table 14 may be separated from substrate 12 to form superabrasive disc 28. For example, prior to or following leaching, superabrasive table 14 may be separated and/or finished from substrate 12 using any number of suitable processes, including a lapping process, a grinding process, electrical-discharge machining (e.g., wire EDM) process, and/or any other suitable material-removal process, without limitation.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes), without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

Figure 3A:
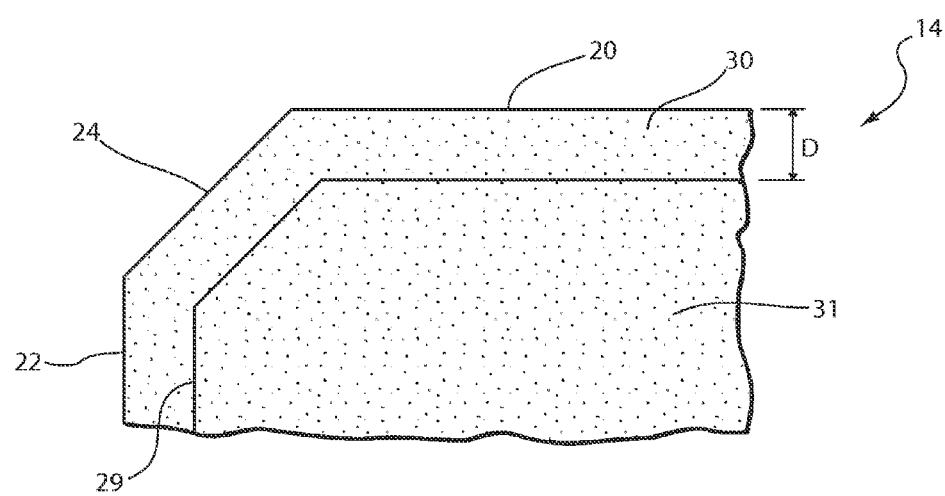
FIG. 3A is a cross-sectional side view of a portion of a superabrasive table according to at least one embodiment.

FIG. 3A is a cross-sectional side view of a portion of an exemplary superabrasive table 14, such as the superabrasive tables 14 illustrated in FIGS. 1 and 2. Superabrasive table 14 may comprise a composite material, such as a PCD material. A PCD material may include a matrix of bonded diamond grains and interstitial regions defined between the bonded diamond grains. Such interstitial regions may be at least partially filled with various materials. In some embodiments, a metal-solvent catalyst may be disposed in at least some or a portion of the interstitial regions in superabrasive table 14. Tungsten and/or tungsten carbide may also be present in at least some or a portion of the interstitial regions.

According to various embodiments, materials may be deposited in or infiltrated into interstitial regions during processing of superabrasive table 14. For example, material components of substrate 12 may migrate into a mass of diamond particles used to form a superabrasive table 14 during HPHT sintering. As the mass of diamond particles is sintered, a metal-solvent catalyst may melt and flow from substrate 12 into the mass of diamond particles. As the metal-solvent flows into superabrasive table 14, it may dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer.

Following sintering, any materials, such as, for example, the metal-solvent catalyst, tungsten, and/or tungsten carbide, may remain in interstitial regions within superabrasive table 14. Such materials in the interstitial regions may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

To improve the performance, heat resistance, and/or the thermal stability of a surface of superabrasive table 14, particularly in situations where the PCD material may be exposed to elevated temperatures, at least a portion of a metal-solvent catalyst, such as cobalt, may be removed from at least a portion of superabrasive table 14. Additionally, tungsten and/or tungsten carbide may be removed from at least a portion of superabrasive table 14. Removing a metal-solvent catalyst from the as-sintered PCD body may reduce damage to the PCD material of superabrasive table 14 caused by expansion of the metal-solvent catalyst. At least a portion of a metal-solvent catalyst, such as cobalt, as well as other materials, may be removed from at least a portion of the as-sintered PCD body using any suitable technique, without limitation.

For example, chemical leaching may be used to remove a metal-solvent catalyst from the as-sintered PCD body up to a depth D from a surface of superabrasive table 14, as illustrated in FIG. 3A. As shown in FIG. 3A, depth D may be measured relative to an external surface of superabrasive table 14, such as superabrasive face 20, superabrasive side surface 22, and/or chamfer 24. In some examples, a metal-solvent catalyst may be removed from superabrasive table 14 up to a depth D from the top of the PCD to through the whole disc or to the interface. In additional examples, a metal-solvent catalyst may be removed from superabrasive table 14 up to a depth D of between approximately 100 and 2500 μm. The as-sintered PCD body may be leached by immersion in an acid or acid solution, such as aqua regia, nitric acid, hydrofluoric acid, or subjected to another suitable process to remove at least a portion of the metal-solvent catalyst from the interstitial regions of the PCD body and form superabrasive table 14 comprising a PCD table. For example, the as-sintered PCD body may be immersed in an acid solution for about 2 to about 7 days (e.g., about 3, 5, or 7 days) or for a few weeks (e.g., about 4 weeks), depending on the process employed.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a leaching agent and/or gas mixture while other portions of one or more surfaces of the as-sintered PCD body may be exposed to the leaching agent and/or gas mixture. For an example, U.S. Pat. Nos. 4,224,380 and 7,972,395, the disclosure of each of which is incorporated herein, in its entirety, by this reference, disclose leaching solutions that may be used for processing superabrasive elements as disclosed herein. Other suitable techniques may be used for removing a metal-solvent catalyst and/or other materials from the as-sintered PCD body or may be used to accelerate a chemical leaching process. For example, exposing the as-sintered PCD body to heat, pressure, electric field/current, microwave radiation, and/or ultrasound may be employed to leach or to accelerate a chemical leaching process, without limitation. Following leaching, superabrasive table 14 may comprise a volume of PCD material that is at least partially free or substantially free of a metal-solvent catalyst.

Following leaching, superabrasive table 14 may comprise a first volume 30 that is substantially free of a metal-solvent catalyst. However, small amounts of catalyst may remain within interstices that are inaccessible to the leaching process. First volume 30 may extend from one or more surfaces of superabrasive table 14 (e.g., superabrasive face 20, superabrasive side surface 22, and/or chamfer 24) to a depth D from the one or more surfaces. First volume 30 may be located adjacent one or more surfaces of superabrasive table 14.

Following leaching, superabrasive table may also comprise a second volume 31 that contains a metal-solvent catalyst. An amount of metal-solvent catalyst in second volume 31 may be substantially the same prior to and following leaching. In various embodiments, second volume 31 may be remote from one or more exposed surfaces of superabrasive table 14. In various embodiments, an amount of metal-solvent catalyst in first volume 30 and/or second volume 31 may vary at different depths in superabrasive table 14.

In at least one embodiment, superabrasive table 14 may include a transition region 29 between first volume 30 and second volume 31. Transition region 29 may include amounts of metal-solvent catalyst varying between an amount of metal-solvent catalyst in first volume 30 and an amount of metal-solvent catalyst in second volume 31. In various examples, transition region 29 may comprise a relatively narrow region between first volume 30 and second volume 31.

Figure 3B:
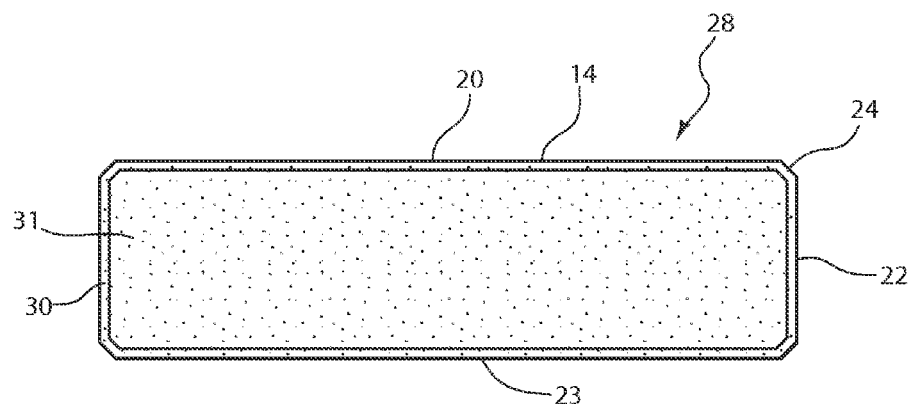
FIG. 3B is a cross-sectional side view of the superabrasive disc according to at least one embodiment.

FIG. 3B is a cross-sectional side view of a superabrasive disc 28, such as the superabrasive disc 28 illustrated in FIG. 2. As shown in FIG. 3B, superabrasive disc 28 may comprise a superabrasive table 14 having a superabrasive face 20, a superabrasive side surface 22, a rear superabrasive face 23, and chamfer 24. As described above in reference to FIG. 3A, a metal-solvent catalyst, as well as other materials, may be removed from at least a portion of superabrasive disc 28. Accordingly, superabrasive disc 28 may comprise a first volume 30 that is substantially free of a metal-solvent catalyst and a second volume 31 that contains a metal-solvent catalyst. As described above, small amounts of catalyst may remain within interstices that are inaccessible to the leaching process in first volume 30.

In at least one example, as shown in FIG. 3B, first volume 30 may extend around a substantial exterior portion of superabrasive disc 28. For example, superabrasive disc 28 may be submerged in or exposed to a leaching agent so that superabrasive face 20, superabrasive side surface 22, rear superabrasive face 23, and chamfers 24 are exposed to the leaching agent, resulting in a first volume 30 that extends substantially around superabrasive disc 28. In some examples, only a portion of superabrasive disc 28 may be exposed to a leaching agent, resulting in a first volume 30 that extends around only a portion of superabrasive disc 28.

Figure 4:
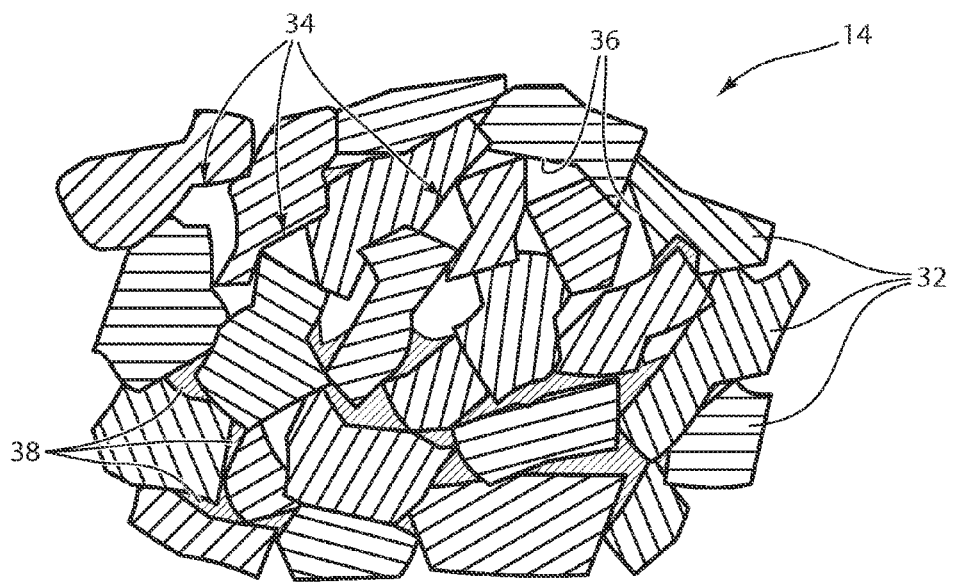
FIG. 4 is a magnified cross-sectional side view of a portion of the superabrasive table according to at least one embodiment.

FIG. 4 is a magnified cross-sectional side view of a portion of the superabrasive table 14 illustrated in FIG. 3A. As shown in FIG. 4, superabrasive table 14 may comprise grains 32 and interstitial regions 34 between grains 32 defined by grain surfaces 36. Grains 32 may comprise grains formed of any suitable superabrasive material, including, for example, diamond grains. At least some of grains 32 may be bonded to one or more adjacent grains 32, forming a polycrystalline diamond matrix.

Interstitial material 38 may be disposed in at least some of interstitial regions 34. Interstitial material 38 may comprise, for example, a metal-solvent catalyst, tungsten, and/or tungsten carbide. As shown in FIG. 4, interstitial material 38 may not be present in at least some of interstitial regions 34. At least a portion of interstitial material 38 may be removed from at least some of interstitial regions 34 during a leaching procedure. For example, a substantial portion of interstitial material 38 may be removed from first volume 30 during a leaching procedure. Additionally, interstitial material 38 may remain in a second volume 31 following a leaching procedure.

In some examples, interstitial material 38 may be removed from table 14 to a depth that improves the performance and heat resistance of a surface of superabrasive table 14 to a desired degree. In some embodiments, interstitial material 38 may be removed from superabrasive table 14 to a practical limit. In order to remove interstitial material 38 from superabrasive table 14 to a depth beyond the practical limit, for example, significantly more time, temperature, and/or body force may be required. In some embodiments, interstitial material 38 may be removed from superabrasive table 14 to a practical limit where interstitial material remains in at least a portion of superabrasive table 14. In various embodiments, superabrasive table 14 may be fully leached so that interstitial material 38 is substantially removed from a substantial portion of superabrasive table 14. In at least one embodiment, interstitial material 38 may be leached from a superabrasive material, such as a PCD material in superabrasive table 14, by exposing the superabrasive material to a suitable leaching agent. Interstitial material 38 may include a metal-solvent catalyst, such as cobalt. Relatively less concentrated and corrosive solutions may be inhibited from leaching a PCD article at a sufficient rate.

In various examples, as will be discussed in greater detail below, at least a portion of a superabrasive material and/or the leaching agent may be heated (e.g., a temperature greater than approximately 50° C.) during leaching. According to additional embodiments, at least a portion of a superabrasive material and a leaching agent may be exposed to at least one of an electric current, microwave radiation, and/or ultrasonic energy. By exposing at least a portion of a superabrasive material to an electric current, microwave radiation, and/or high frequency ultrasonic energy as the superabrasive material is exposed to a leaching agent, the rate at which the superabrasive material is leached and/or the depth to which the superabrasive material is leached may be increased.

Figure 5:
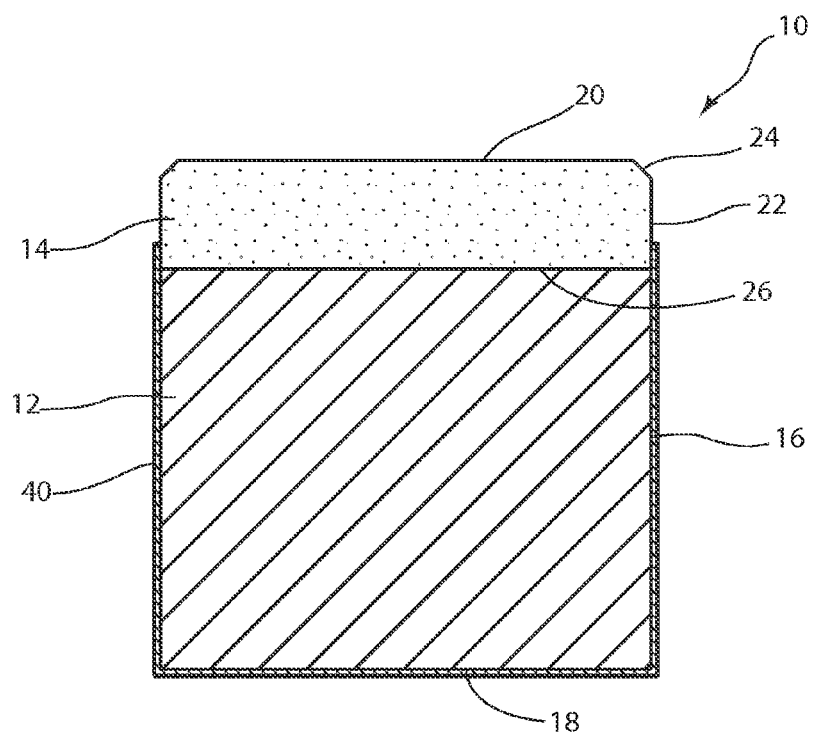
FIG. 5 is a cross-sectional side view of an exemplary superabrasive element that is at least partially surrounded by a protective layer according to at least one embodiment.

FIG. 5 is a cross-sectional side view of an exemplary superabrasive element 10 that is at least partially surrounded by a protective layer 40 according to at least one embodiment. As shown in FIG. 5, at least a portion of superabrasive element 10, including substrate 12, may be surrounded by protective layer 40. According to various embodiments, protective layer 40 may comprise an inert cup, a protective coating, and/or any other suitable protective layer that inhibits or prevents a leaching agent, a cleaning agent, and/or any other desired processing agent from contacting at least a portion of the superabrasive element 10. Protective layer 40 may prevent or inhibit a leaching agent from chemically damaging certain portions of superabrasive element 10, such as, for example, substrate 12, a portion of superabrasive table 14, or both, during leaching. Protective layer 40 may be selectively formed over substrate 12 and/or a selected portion of superabrasive table 14 in any pattern, design, or as otherwise desired, without limitation. Such a configuration may provide selective leaching of superabrasive table 14, which may be beneficial. Following leaching of superabrasive table 14, protective layer 40 may be removed from superabrasive element 10.

Figure 6A:
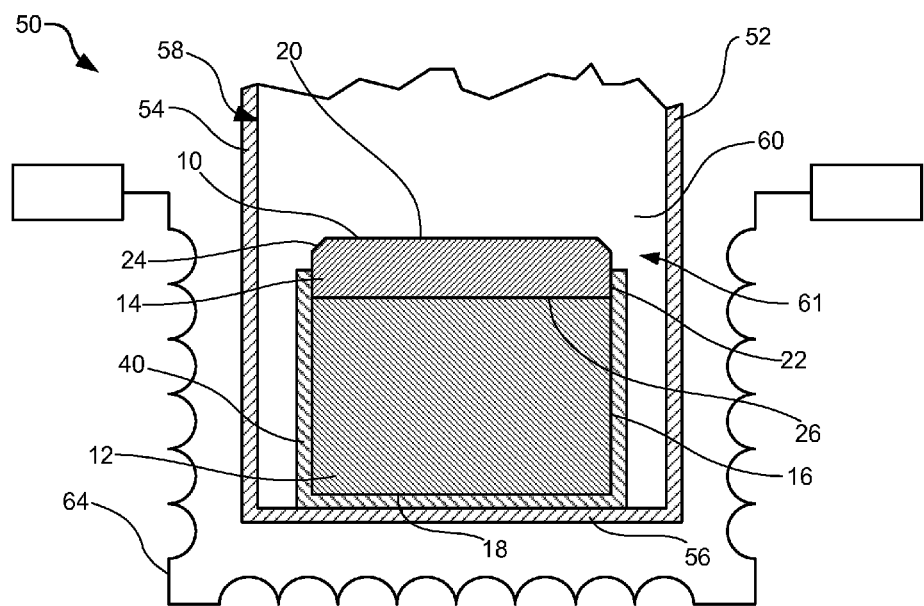
FIG. 6A is a cross-sectional side view of an exemplary superabrasive material processing assembly according to at least one embodiment.

FIG. 6A is a cross-sectional side view of an exemplary superabrasive material processing assembly 50 for processing a superabrasive element 10 according to at least one embodiment. The processing of superabrasive element 10 may include, for example, leaching, cleaning, and/or rinsing superabrasive element 10, without limitation. A cleaning agent may include any material suitable for cleaning the leaching agent and other compounds, such as dissolved compounds including a catalyst material, from interstitial spaces in superabrasive element 10 after completion of the leaching process. Superabrasive element 10 may be exposed to the cleaning agent in any suitable manner, such as, for example, by submerging at least a portion of the polycrystalline diamond material in the cleaning agent. As shown in FIG. 6A, a superabrasive element 10 may be positioned within a processing container 52. Processing assembly 50 and/or any of the other processing assembly embodiments illustrated herein may additionally or alternatively be used to leach, clean, or otherwise process any other type of superabrasive body, including, for example, PDC, a PDC insert, a superabrasive element, or a disc (e.g., superabrasive disc 28 illustrated in FIG. 2) that is not coupled to a substrate.

As illustrated in FIG. 6A, processing container 52 may have a rear wall 56 and a side wall 54 defining a cavity 58. Rear wall 56 and side wall 54 may have any suitable shape, without limitation. Cavity 58 may contain a processing agent 60 that at least partially surrounds superabrasive element 10 such that at least a portion of superabrasive element 10 is exposed to processing agent 60. A first volume 61 of processing agent 60 may be disposed adjacent superabrasive element 10. First volume 61 represents a volume of fluid that is positioned adjacent to superabrasive element 10 and upon which a body force is exerted (e.g., due to its own mass, the mass of another fluid, and/or by any other mechanism described herein for generating and/or exerting a body force, without limitation). Superabrasive element 10 may be positioned in first volume 61 so that superabrasive element 10 contacts rear wall 56 of processing container 52. In some embodiments, superabrasive element 10 may be positioned and/or secured within processing container 52 using any suitable mechanism, without limitation. Processing agent 60 may be a leaching agent, a cleaning agent, a rinsing agent, and/or any other suitable agent for processing superabrasive element 10.

As shown in FIG. 6A, a protective layer may at least partially surround superabrasive element 10 to prevent processing agent 60 from contacting at least a portion of superabrasive element 10. For example, protective layer 40 may surround a substrate 12, while at least portions of superabrasive table 14, including superabrasive face 20, chamfer 24, and/or superabrasive side surface 22 remain exposed to processing agent 60. In this way, portions of superabrasive element 10, such as substrate 12, can be selectively inhibited or prevented from contacting processing agent 60 during processing. In an additional embodiment, superabrasive element 10 or any other suitable superabrasive body (e.g., superabrasive disc 28 shown in FIG. 2) may be leached with or without a protective layer disposed thereon.

In some embodiments, a body force on processing agent 60 and superabrasive element 10 may be developed through other mechanisms. For example, processing container 52 may be spun in a centrifuge in order to develop a body force in processing agent 60 and/or superabrasive element 10, (as will also be described in more detail below with reference to FIGS. 7A and 7B). In additional embodiments, a second fluid having a different density than processing agent 60 may be placed adjacent to processing agent 60 in order exert a body force on processing agent 60 (as will be discussed in greater detail below with reference to FIGS. 9 and 10).

According to various embodiments, at least a portion of processing agent 60 and/or superabrasive element 10 may be heated during processing. For example, as illustrated in FIG. 6A, a heating element 64 may be disposed around at least a portion of processing container 52. For example, heating element 64 may at least partially surround a portion of processing container 52 adjacent first volume 61 of processing agent 60 and/or superabrasive element 10 in order to generate and/or apply heat to processing agent 60 and/or superabrasive element 10. Heating of processing agent 60 and/or superabrasive element 10 may additionally or alternatively be accomplished by any other suitable means, such as, for example, resistance-based heating, inductive heating, convection heating, dielectric heating, and/or combustion source heating, without limitation. Additionally, heating elements may be placed in different positions, such as, for example, within processing container 52, within side wall 54 and/or within rear wall 56 of processing container 52. Additionally or alternatively, processing agent 60 and/or superabrasive element 10 may be heated directly by applying an electric current and/or field or microwaves thereto, or a pre-heated processing agent 60 may be injected into first volume 61 of processing container 52.

According to various embodiments, a superabrasive material may be exposed to a processing agent 60, such as a leaching agent, in order to remove various materials from the interstitial regions in the superabrasive material. Certain techniques may be utilized to accelerate leaching of superabrasive element 10. For example, adding heat to increase the temperature of processing agent 60 and/or superabrasive element 10 may increase the leaching efficiency and/or decrease an amount of time required to complete the leaching process. Based, for example, on the type of processing agent 60 used, the temperature of processing agent 60 and/or superabrasive element 10, and how long the process is carried out, the amount of interstitial materials removed from superabrasive table 14, the depth D to which the materials are removed from superabrasive table 14, and/or the amount of materials remaining in the interstitial regions of superabrasive table 14 may be controlled.

In various examples, at least a portion of superabrasive element 10 and processing agent 60 are exposed to a temperature that is close to, at, below, or above a temperature required for a phase change to the gas phase under standard conditions (e.g., standard temperature and pressure). According to some embodiments, depending on the type of processing agent 60 used, processing agent 60 and/or superabrasive element 10 may be heated to temperatures greater than approximately 50° C. For example, processing agent 60 and/or superabrasive element 10 may be heated to temperatures ranging from approximately 50° C. up to, or in excess of 500° C. (e.g., approximately 60° C., 70° C., 80° C., 90° C., 100° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., 500° C.).

Although increasing the temperature of processing agent 60 may, in some configurations, lead to accelerated leaching, leaching may be improved if processing agent 60 is kept from changing to a gas phase. For example, reducing or preventing phase change, and/or excessive evaporation of processing agent 60 may prevent loss of processing agent 60 and/or one or more components of processing agent 60 from processing container 52. Preventing phase change, and/or excessive evaporation of processing agent 60 may also ensure consistent submersion and orientation of superabrasive element 10 in processing agent 60. In order to prevent or reduce phase change of the processing agent 60, a sufficient body force may be exerted on first volume 61 of processing agent 60.

Figure 6B:
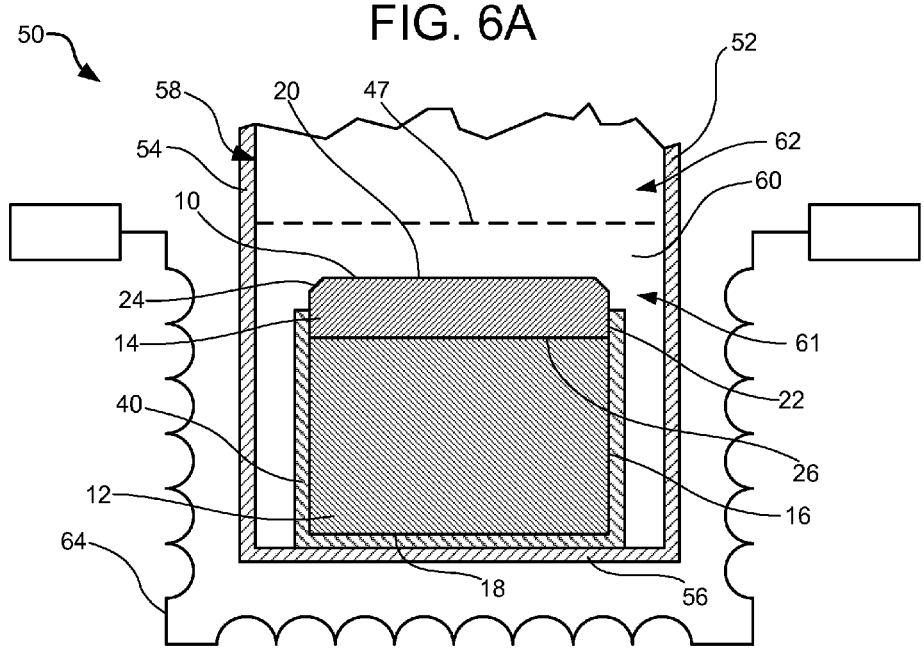
FIG. 6B is a cross-sectional side view of another exemplary superabrasive material processing assembly according to at least one embodiment.

Optionally, as illustrated in FIG. 6B, processing assembly 50 may additionally include a second volume 62 comprising processing agent 60 and/or another fluid composition disposed within processing container 52. For example, second volume 62 of processing agent 60 may be disposed adjacent to first volume 61. Boundary line 47 illustrated in FIG. 6A represents a boundary between first volume 61 and second volume 62. While in some embodiments, fluid compositions in processing container 52 may flow freely between first volume 61 and second volume 62, first volume 61 represents a volume of fluid that is positioned adjacent to superabrasive element 10 and upon which a body force is exerted (e.g., due to its own mass, by second volume 62, and/or by any other mechanism described herein for generating and/or exerting a body force, without limitation).

Second volume 62 of processing agent 60 may exert a body force on first volume 61 of processing agent 60, thereby facilitating processing of superabrasive element 10, as will be described in further detail below. In some embodiments, a body force on processing agent 60 and superabrasive element 10 may be developed through other mechanisms. For example, processing container 52 may be spun in a centrifuge in order to develop a body force in processing agent 60 and/or superabrasive element 10, (as will also be described in more detail below with reference to FIGS. 7A and 7B). In additional embodiments, a second fluid having a different density than processing agent 60 may be placed adjacent to processing agent 60 in order exert a body force on processing agent 60 (as will be discussed in greater detail below with reference to FIGS. 9 and 10).

Figure 6C:
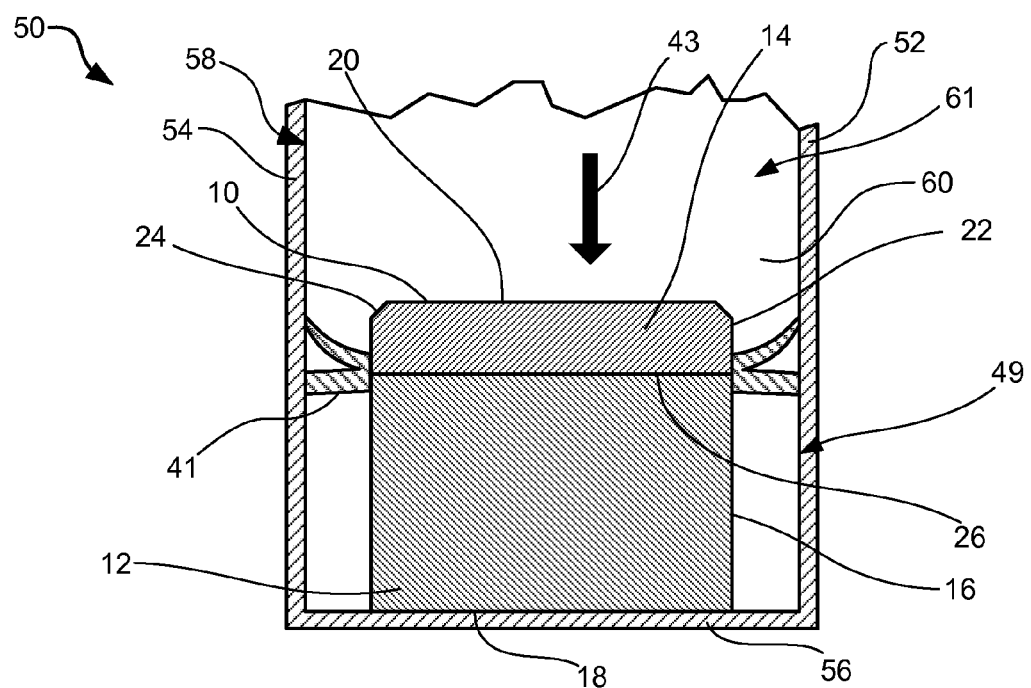
FIG. 6C is a cross-sectional side view of another exemplary superabrasive material processing assembly according to at least one embodiment.

According to some embodiments, as illustrated in FIG. 6C, processing assembly 50 may additionally include a resilient seal 41 (e.g., a V-seal or an O-ring) surrounding at least a portion of superabrasive element 10. Resilient seal 41 may be made of any suitable material for protecting at least a portion of superabrasive element 10 from processing agent 60, without limitation. For example, resilient seal 41 may comprise an elastic polymeric material. Superabrasive element 10 and resilient seal 41 may be placed in cavity 58 of processing container 52 so that resilient seal 41 contacts side wall 54 of processing container 52 and surrounds at least a portion of side surface 22 of superabrasive table 14 and/or side surface 16 of substrate 12. According to at least one embodiment, resilient seal 41 may be placed around superabrasive element 10 prior to placing superabrasive element 10 into cavity 58 of processing container 52.

With resilient seal 41 disposed between side wall 54 of processing container 52 and side surfaces 22 and/or 16 of superabrasive element 10, a sealed cavity 49 may be defined by resilient seal 41, side surface 16 of substrate 12, side wall 54 of processing container 52, and rear wall 56 of processing container 52. Processing agent 60 may be disposed in processing container 52 adjacent to superabrasive element 10 and resilient seal 41 such that processing agent 60 is prevented or inhibited from entering sealed cavity 49. Resilient seal 41 may isolate substrate 12 and/or at least a portion of superabrasive table 14 from processing agent 60 so as to prevent and/or inhibit substrate 12 and/or at least a portion of superabrasive table 14 from contacting processing agent 60. Resilient seal 41 may prevent or inhibit processing agent 60 from chemically damaging certain portions of superabrasive element 10, such as, for example, substrate 12, a portion of superabrasive table 14, or both, during leaching. Such a configuration may further provide selective leaching of superabrasive table 14.

As illustrated in FIG. 6C, resilient seal 41 may have a substantially V-shaped cross section. This cross section may allow resilient seal 41 to be compressed by processing agent 60. For example, resilient seal 41 may be compressed by the weight and/or centrifugal force of a processing agent 60 causing a body force to be applied to resilient seal 41 in direction 43. Resilient seal 41 may further be compressed due to an increased body force acting on processing agent 60 due rotation in a centrifuge, as described with respect to FIGS. 7A and 7B below, or due to a second fluid exerting an added force on processing agent 60 as described with respect to FIGS. 9-10 below. Compression of resilient seal 41 due to a body force applied by processing agent 60 may cause resilient seal 41 to expand between side surface 16 and side wall 54. Such expansion may cause resilient seal 41 to exert an inward force against side surfaces 22 and/or 16 of superabrasive element 10, thus tightening the seal around superabrasive element 10 and preventing or inhibiting processing agent 60 from contacting substrate 12. While a v-shaped cross section is shown, resilient seal 41 may optionally have a circular cross-section, a rectangular cross-section, or any other suitable cross-sectional shape for creating a seal between superabrasive element 10 and side wall 54 of processing container 52.

Figure 7A:
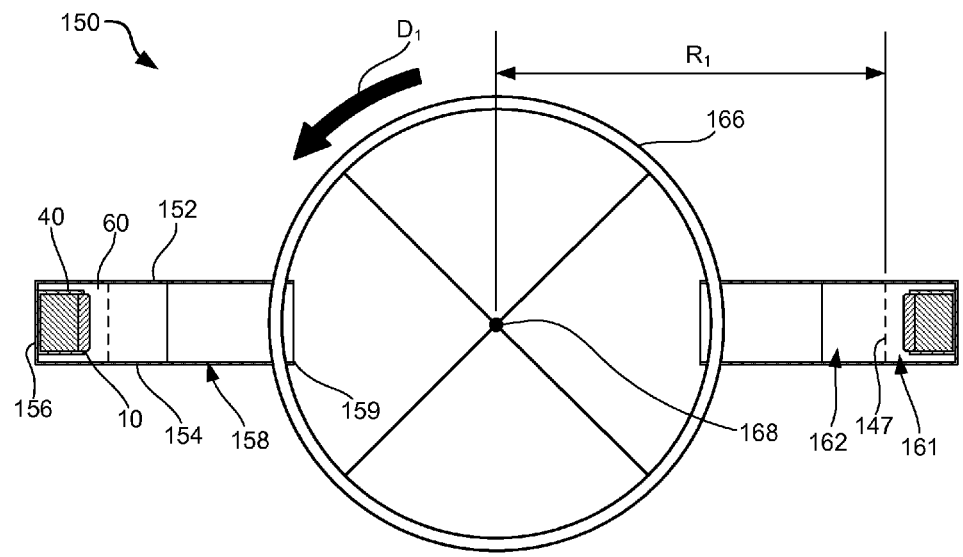
FIG. 7A is a cross-sectional side view of an exemplary superabrasive material processing assembly according to at least one embodiment.

FIG. 7A is a cross-sectional side view of an exemplary superabrasive material processing assembly 150 according to at least one embodiment. A processing assembly for processing a superabrasive element 10 may use high-speed rotation of processing chamber 152 to develop a centrifugal body force in processing agent 60. For example, as shown in FIG. 7A, processing assembly 150 may include a centrifuge 166 that rotates processing containers 152 at high speed about rotational axis 168 in rotational direction Di. One or more processing containers 152 may be coupled to centrifuge 166. For example, two processing containers 152 may be coupled to centrifuge 166 as shown in FIG. 7A.

As illustrated in FIG. 7A, each processing chamber 152 may have a rear wall 156 and a side wall 154 defining a cavity 158 within processing chamber 152. Cavity 158 of each processing chamber 152 may be open to atmospheric surroundings through an opening 159 defined in a portion of processing chamber 152 that is disposed apart from superabrasive element 10 and/or first volume 161. Cavity 158 may contain a processing agent 60 that at least partially surrounds superabrasive element 10 such that at least a portion of superabrasive element 10 is exposed to processing agent 60. A first volume 161 of processing agent 60 may be disposed adjacent superabrasive element 10. Additionally, optionally, a second volume 162 of processing agent 60 may be disposed within processing chamber 152 adjacent to first volume 161 at boundary line 147. Superabrasive element 10 may be positioned in first volume 161 so that superabrasive element 10 contacts rear wall 156 of processing chamber 152. In some embodiments, superabrasive element 10 may be positioned and/or secured within processing chamber 152 using any suitable mechanism, without limitation. Processing agent 60 may be a leaching agent, a cleaning agent, a rinsing agent, and/or any other suitable agent for processing superabrasive element 10.

In one embodiment, at least a portion of superabrasive element 10 and processing agent 60 may be heated to a temperature that is at, close to, below, or above the temperature for phase change of processing agent 60 under standard conditions (e.g., standard temperature and pressure). Heating of processing agent 60 may be accomplished by any suitable means, such as, for example, resistance-based heating, inductive heating, dielectric heating, and/or combustion source heating, without limitation. Additionally, heating elements may be placed in different positions, such as, for example, within cavity 158 of processing chamber 152, within side wall 154 and/or rear wall 156 of processing chamber 152. Additionally or alternatively, processing agent 60 and/or superabrasive element 10 may be heated directly by applying an electric current or field thereto, or to the side wall 154 and/or rear wall 156 of processing chamber 152, or a pre-heated processing agent 60 may be injected into first volume 161 of processing chamber 152.

As described above, preventing phase change, and/or excessive evaporation of processing agent 60 may further facilitate leaching of superabrasive element 10 by preventing loss of processing agent 60 and/or one or more components of processing agent 60 from processing chamber 152. A phase change may be prevented or inhibited by developing a sufficient centrifugal body force on first volume 161 of processing agent 60 by spinning processing chamber 152 within centrifuge 166 during processing of superabrasive element 10.

Centrifuge 166 may be spun in rotational direction Di at a rotational frequency sufficient to exert a centrifugal body force on first volume 161 of processing agent 60 that is sufficient to prevent or inhibit processing agent 60 from changing phase and/or excessively evaporating at an elevated temperature. For example, in order to prevent or inhibit a phase change, and/or excessive evaporation of a processing agent 60 having a density that is approximately the same as water and that is heated to a temperature of approximately 200° C., a centrifuge 166 having a rotational radius $R_1$ of 20 cm might be spun at a rotational frequency of approximately 7,000, 8,000, 9,000, or 10,000 RPM or more, thereby subjecting first volume 161 to an acceleration level of approximately 14,000; 16,000; 17,000; 18,000; 19,000; 20,000 $g_n$, or more where g is 9.81 m/s². According to at least one embodiment, rotational radius $R_1$ is measured from rotational axis 168 to a portion of first volume 161 of processing agent 160.

Centrifuge 166 may have any suitable rotational radius $R_1$ and may be rotated at any suitable rotational frequency, without limitation. The RPM required to exert a desired centrifugal body force may vary based on the rotational radius $R_1$ of centrifuge 166 as well as the height and density of processing agent 160. For example, a centrifuge 166 with a larger radius (e.g., R1) will require a lower rotational frequency (i.e., lower RPM) to produce the required centrifugal body force on the processing agent 60, while a centrifuge with a smaller radius will require a higher rotational frequency (i.e., higher RPM) to produce the required force. Additionally, the centrifugal body force required to prevent or inhibit a phase change and/or excessive evaporation of processing agent 60 may vary depending on the phase change temperature of the particular processing agent 60 used. Each different processing agent 60 may have a different composition and/or phase change temperature when compared to other processing agents and would, therefore, require a different centrifugal body force to prevent or inhibit a phase change of the processing agent 60 during processing of the superabrasive element 10.

Figure 7B:
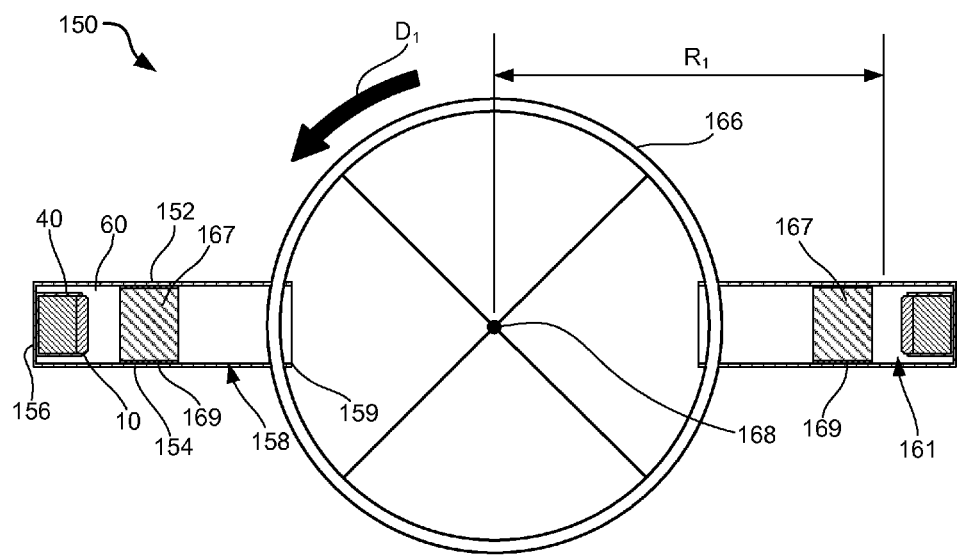
FIG. 7B is a cross-sectional side view of another exemplary superabrasive material processing assembly according to at least one embodiment.

According to some embodiments, as illustrated in FIG. 7B, processing assembly 150 may optionally include a piston element 167 disposed within processing chamber 152 adjacent to first volume 161 of processing agent 60 at boundary line 147. In some embodiments, piston element 167 may be at least partially surrounded by a seal element 169 (e.g. an O-ring) to seal processing agent 60 within first volume 161. Piston element 167 may exert a force on processing agent 60 due to high speed rotation of centrifuge 166.

As described above, preventing or inhibiting phase change and/or excessive evaporation of processing agent 60 may further facilitate leaching of superabrasive element 10 by preventing or inhibiting loss of processing agent 60 and/or one or more components of processing agent 60 from processing chamber 152. A phase change may be prevented or inhibited by developing a sufficient centrifugal body force on first volume 161 of processing agent 60 by spinning processing chamber 152 within centrifuge 166 during processing of superabrasive element 10. With piston element 167 exerting an additional force on processing agent 60, a lower rotational frequency (i.e., lower RPM) may be required to produce the required centrifugal body force on processing agent 60 to prevent or inhibit a phase change and/or excessive evaporation of processing agent 60 during processing of the superabrasive element 10.

While FIGS. 7A and 7B illustrate superabrasive element 10 at least partially protected from processing agent 60 using protective layer 40, superabrasive element 10 may optionally be at least partially protected from contact with processing agent 60 using a resilient seal (e.g., resilient seal 41 illustrated in FIG. 6C) and/or any other suitable protection from processing agent 60, without limitation.

Figure 8:
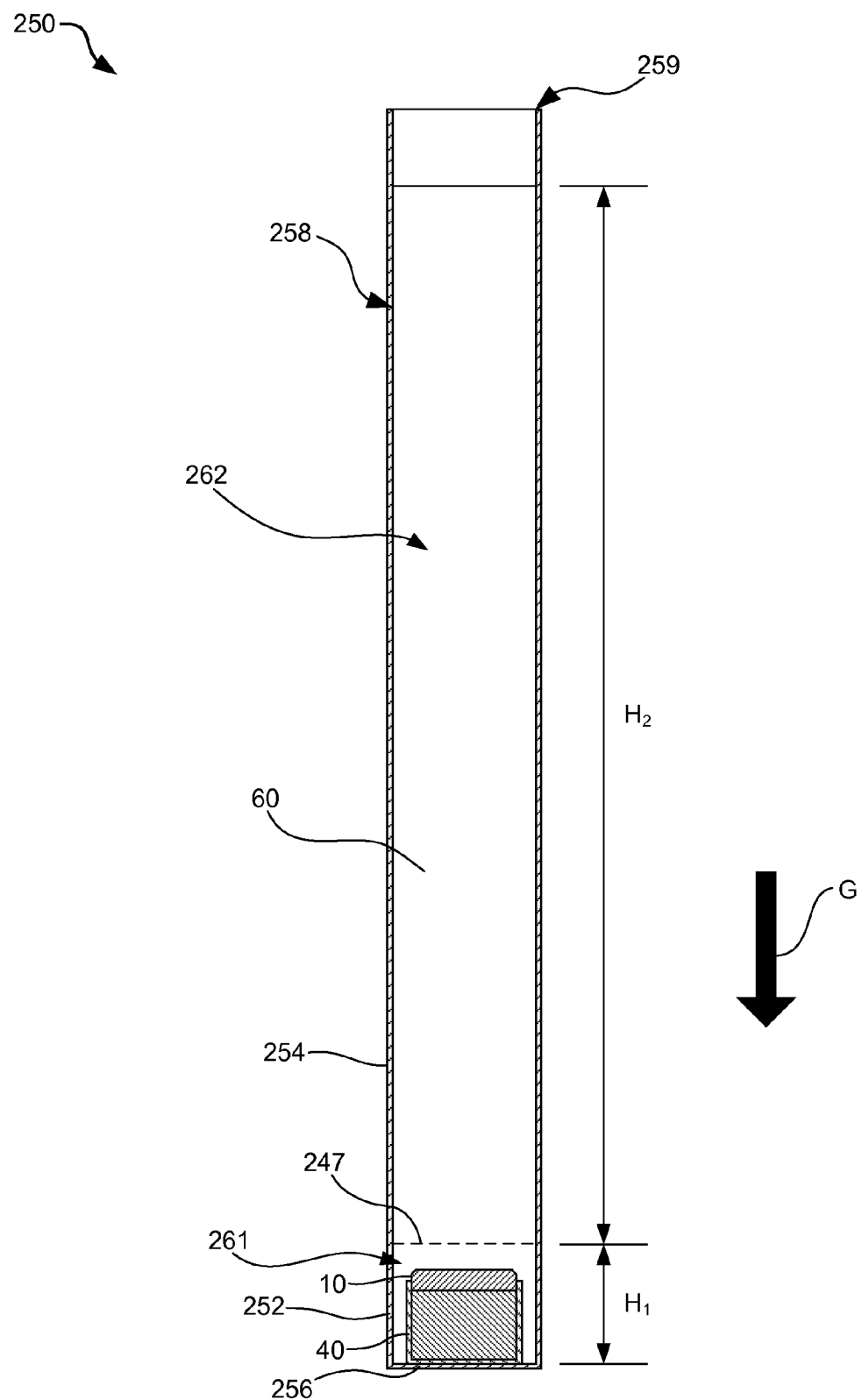
FIG. 8 is a cross-sectional side view of another exemplary superabrasive material processing assembly according to at least one embodiment.

FIG. 8 is a cross-sectional side view of an exemplary superabrasive material processing assembly 250 according to at least one embodiment. As shown in FIG. 8, processing assembly 250 may include a processing container 252 comprising any suitable fluid conduit, such as, for example, substantially a vertical column. Side wall 254 and rear wall 256 of processing container 252 may define a cavity 258 within the processing container 252. A first volume 261 of processing agent 60 may be disposed adjacent superabrasive element 10 and a second volume 262 may be disposed within processing container 252 adjacent to first volume 261 such that second volume 262 exerts a gravitational body force on first volume 261. Second volume 262 may be adjacent to first volume 261 at boundary line 247

Each of first volume 261 and second volume 262 may have heights of height $H_1$ and height $H_2$, respectively. As shown in FIG. 8, a height $H_2$ of second volume 262 may be greater than a height $H_1$ of first volume 261. Cavity 258 of processing container 252 may be open to atmospheric surroundings through an opening 259 defined in a portion of processing container 252 (e.g., a vertically upper end) that is disposed apart from superabrasive element 10 and/or first volume 261. Second volume 262 may include processing agent 60 and/or may include another fluid having a density different than processing agent 60. Fluid in second volume 262 may push gravitationally downward (i.e., in the direction G of gravitational acceleration) on first volume 261 so as to exert a body force on processing agent 60 sufficient to prevent or inhibit a phase change of processing agent 60 during processing of superabrasive element 10.

Processing container 252 may have a longitudinal height accommodating a height $H_2$ of fluid that exerts a gravitational body force on first volume 261 of processing agent 60 that is sufficient to prevent or inhibit processing agent 60 from changing phase, and/or excessively evaporating even if it is heated. Height $H_2$ of second volume 262 may be significantly greater than height $H_1$ of first volume 261 so as to exert a sufficient body force on first volume 261. For example, height $H_2$ may be one or more orders of magnitude greater than height $H_1$.

Figure 9:
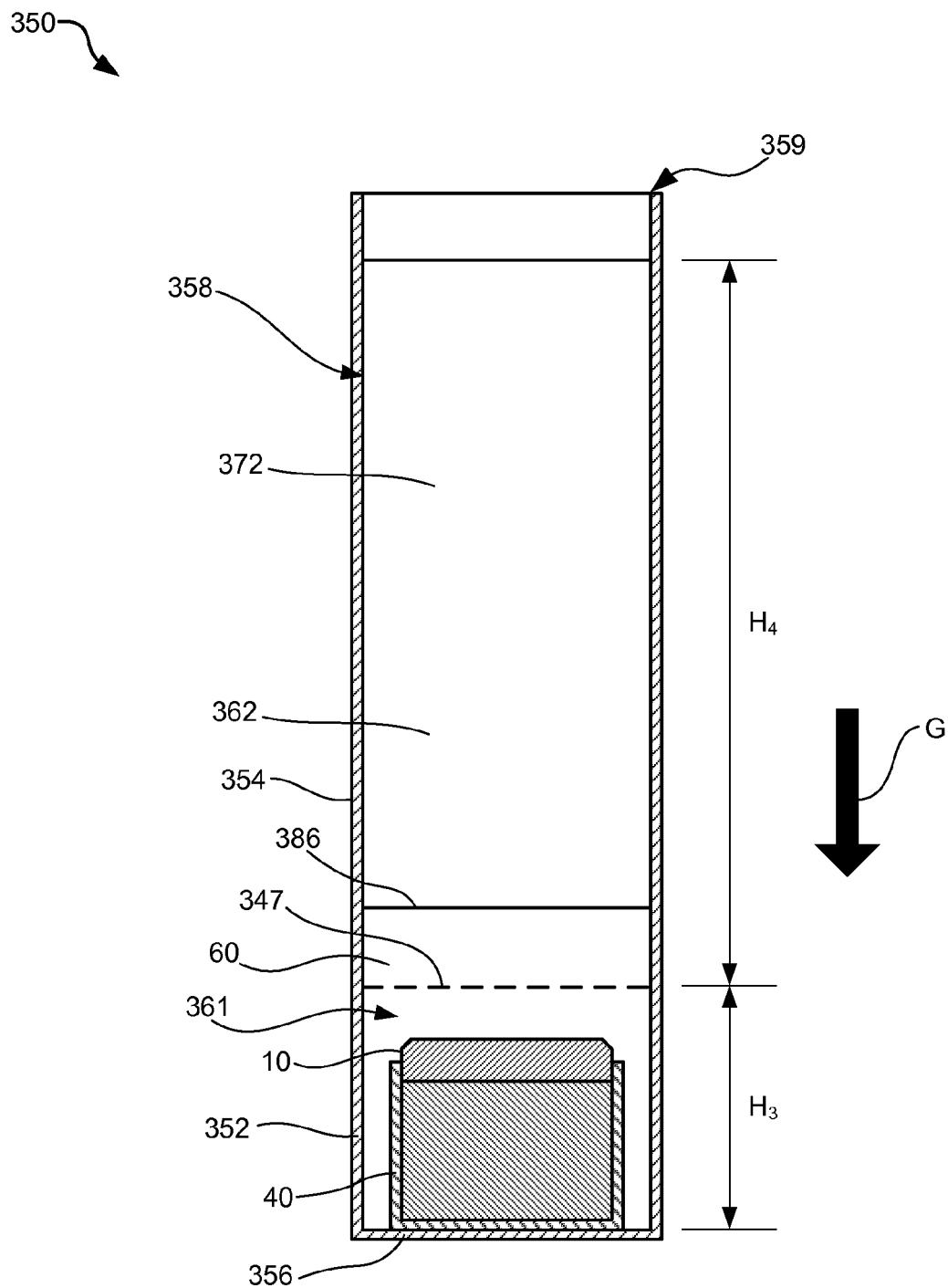
FIG. 9 is a cross-sectional side view of another exemplary superabrasive material processing assembly according to at least one embodiment.

FIG. 9 is a cross-sectional side view of an exemplary superabrasive material processing assembly 350 according to at least one embodiment. As shown in FIG. 9, side wall 354 and rear wall 356 of processing container 352 may define a cavity 358 within the processing container 352. A first volume 361 of processing agent 60 may be disposed adjacent superabrasive element 10. Optionally, a second volume 362 may be disposed within processing container 352 adjacent to first volume 361 such that second volume 362 exerts a body force (e.g., gravitational and/or centrifugal) on first volume 361. Second volume 362 may be adjacent to first volume 361 at boundary line 347. A partial or substantial portion of second volume 362 may comprise a second fluid 372 in addition to or excluding processing agent 60. Fluid in second volume 362 may exert a body force on processing agent 60 sufficient to prevent or inhibit a phase change of processing agent 60 during processing of superabrasive element 10. Superabrasive element 10 may be positioned and/or secured within processing container 352 using any suitable mechanism, without limitation. Processing agent 60 may be a leaching agent, a cleaning agent, a rinsing agent, or any other suitable agent for processing a superabrasive element 10. Cavity 358 of processing container 352 may be open to atmospheric surroundings through an opening 359 at or near the top of the processing container 352.

At least a portion of superabrasive element 10 and processing agent 60 may exhibit a temperature that is close to, at, below, or above a phase change temperature of processing agent 60 under standard conditions (e.g., standard temperature and pressure). Heating of processing agent 60 may be accomplished by any suitable means, such as, for example, resistance-based heating, inductive heating, microwave heating, dielectric heating, and/or combustion source heating, without limitation. Additionally, heating elements may be placed in different positions, such as, for example, within cavity 358 of processing container 352 and/or within the walls of processing container 352. Additionally or alternatively, processing agent 60 and/or superabrasive element 10 may be heated by applying an electric current or field thereto, to any of the walls of processing container 352, or a pre-heated processing agent 60 may be injected into first volume 361 of processing container 352.

As described above, preventing or inhibiting phase change and/or excessive evaporation of processing agent 60 may further facilitate leaching and/or cleaning of superabrasive element 10 by preventing or inhibiting loss of processing agent 60 and/or one or more components of processing agent 60 from processing container 352. Second fluid 362 may be disposed gravitationally above processing agent 60 so as to exert a sufficient gravitational body force on first volume 361 of processing agent 60 to prevent or inhibit a phase change, and/or excessive evaporation during processing of superabrasive element 10.

According to some embodiments, second fluid 372 may have a different density (e.g., a lower density) than processing agent 60 and may be disposed adjacent to processing agent 60 in order to exert a gravitational body force on processing agent 60 in first volume 361 so as to prevent or inhibit a phase change of processing agent 60 during processing of superabrasive element 10. Second fluid 372 may comprise any suitable fluid composition, without limitation. Processing agent 60 and second fluid 372 may comprise separate fluid compositions that are substantially insoluble with respect to each other in order to maintain separation between processing agent 60 and second fluid 372. In at least one embodiment, second fluid 372 may act as an evaporation barrier inhibiting or preventing evaporation of processing agent 60. In some embodiments, second fluid 372 may comprise a fluid having a density less than that of processing agent 60.

Second fluid 372, which may be disposed gravitationally above processing agent 60 inside processing container 352, may exert a downward gravitational body force on processing agent 60 as second fluid 372 pushes gravitationally downward (i.e., in the direction G of gravitational acceleration) against processing agent 60 at fluid interface 386. The amount of gravitational body force exerted on processing agent 60 under standard conditions (e.g., standard temperature and pressure) is related to the density of second fluid 372 and the height of second fluid 372 relative to processing agent 60. Second fluid 372 may have a height H4 that is much greater than a height H3 of processing agent 60 so as to exert a sufficient gravitational body force on processing agent 60 and prevent or inhibit a phase change and/or excessive evaporation of processing agent 60 during processing of superabrasive element 10.

Figure 10:
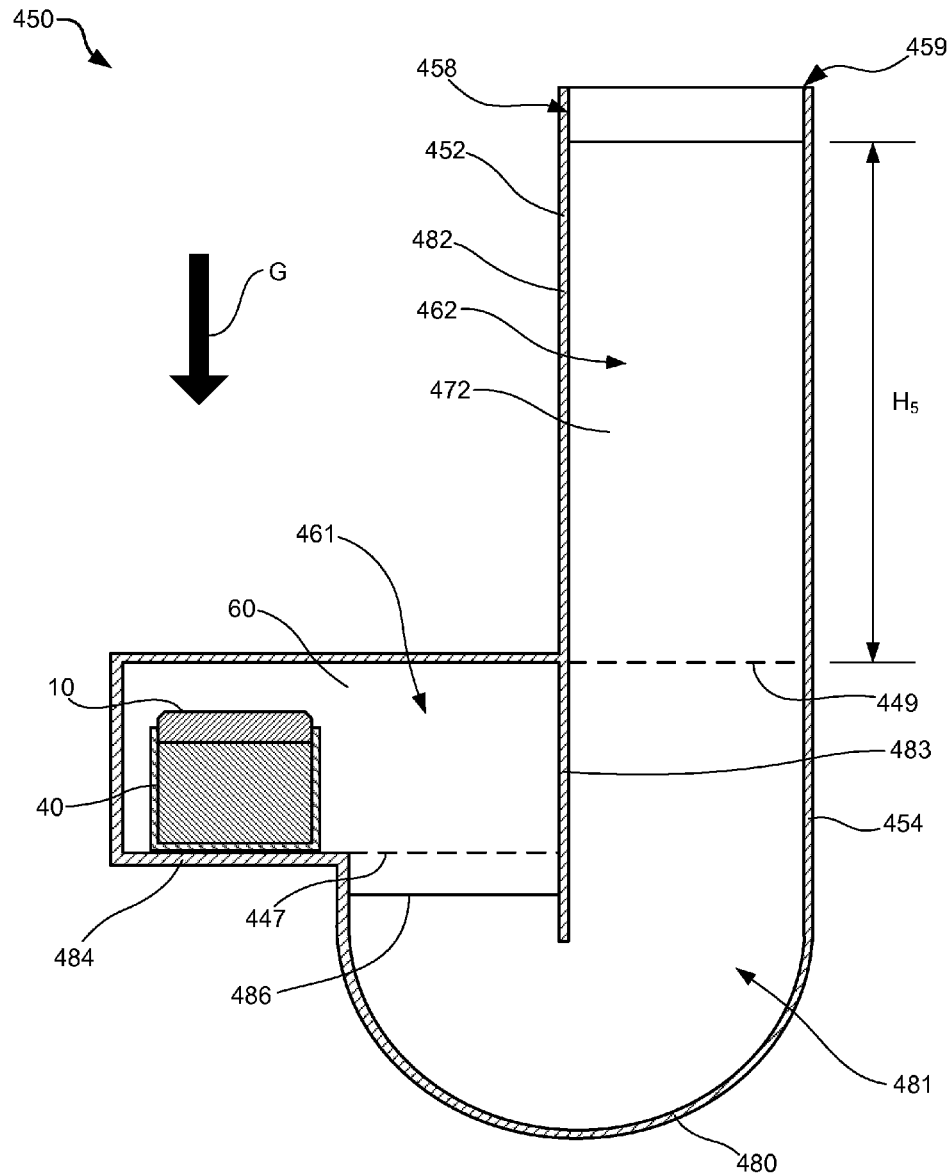
FIG. 10 is a cross-sectional side view of another exemplary superabrasive material processing assembly according to at least one embodiment.

FIG. 10 is a cross-sectional side view of an exemplary superabrasive material processing assembly 450 according to at least one embodiment. As shown in FIG. 10, container walls 454 and divider 483 of processing container 452 may define a cavity 458 within processing container 452. Container walls 454 of processing container 452 may define an elongated portion 482, a transition portion 480, and a processing portion 484 of processing assembly 450. Elongated portion 482 may include an opening 459 at or near one end. Another end of elongated portion 482 may be adjacent to transition portion 480. Transition portion 480 may extend from elongated portion 482 to processing portion 484.

According to some embodiments, transition portion 480 may be bent so as to connect elongated portion 482 to processing portion 484. Divider 483 may be positioned between elongated portion 482 and processing portion 484 such that processing portion 484 is open to elongated portion 482 via transition portion 480. Divider 483 may comprise a wall and/or other feature disposed between elongated portion 482 and processing portion 484 of processing container 452. Superabrasive element 10 and a first volume 461 comprising processing agent 60 may be disposed within processing portion 484 of processing container 452. Superabrasive element 10 may be positioned and/or secured within processing container 452 using any suitable mechanism, without limitation. Processing agent 60 may comprise a leaching agent, a cleaning agent, a rinsing agent, and/or any other suitable agent for processing a superabrasive element 10. Cavity 458 of the processing assembly 450 may be open to atmospheric surroundings through an opening 459 at the top of the processing container 452. A second volume 462 may be disposed within elongated portion 482 and transition portion 480. Second volume 462 may comprise a portion of second fluid 472 that is disposed gravitationally higher than first volume 461 comprising processing agent 60. Additionally, a transition volume 481 may extend from second volume 462 to first volume 461. Transition volume 481 may be adjacent to second volume 462 at boundary line 449 and may be adjacent to first volume 461 at boundary line 447. At least a portion of transition volume 481 may comprise second fluid 472. Additionally, at least a portion of transition volume 481 adjacent to first volume 461 may comprise processing agent 60.

At least a portion of superabrasive element 10 and processing agent 60 may be exposed to a temperature that is close to or above a phase change temperature of processing agent 60 under standard conditions (e.g., standard temperature and pressure). Heating of processing agent 60 may be accomplished by any suitable means, such as, for example, resistance-based heating, inductive heating, microwave heating, dielectric heating, and/or combustion source heating, without limitation. Additionally, heating elements may be placed in different positions, such as, for example, within cavity 458 of processing container 452 and/or within the walls of processing container 452. Additionally or alternatively, processing agent 60 and/or superabrasive element 10 may be heated by applying an electric current or field thereto, to any of the walls of processing container 452, or a pre-heated processing agent 60 may be injected into first volume 461 of processing container 452.

As described above, preventing or inhibiting phase change and/or excessive evaporation of processing agent 60 may further facilitate leaching and/or cleaning of superabrasive element 10 by preventing or inhibiting loss of processing agent 60 and/or one or more components of processing agent 60 from processing container 452. Second fluid 462 may be disposed gravitationally above processing agent 60 so as to exert a sufficient gravitational body force on first volume 461 of processing agent 60 to prevent or inhibit a phase change and/or excessive evaporation during processing of superabrasive element 10.

According to some embodiments, second fluid 472 may have a different density (e.g., a greater density) than processing agent 60 and may be disposed adjacent to first volume 461. For example, second fluid 472 may comprise a fluid composition that is denser than processing agent 60. Second fluid 472 may comprise any suitable fluid composition, without limitation. Processing agent 60 and second fluid 472 may comprise separate fluid compositions that are substantially insoluble with respect to each other in order to maintain separation between processing agent 60 and second fluid 472. In at least one embodiment, second fluid 472 may act as an evaporation barrier inhibiting or preventing evaporation of processing agent 60.

Processing assembly 450 may facilitate the use of a second fluid 472 to exert a gravitational body force on first volume 461 of processing agent 60, particularly when second fluid 472 is more dense than processing agent 60. For example, first volume 461 of processing agent 60 may be disposed within processing portion 484 of processing container 452 at a position that is gravitationally above an adjacent portion of second fluid 472. Accordingly, while the adjacent portion second fluid 472 is disposed gravitationally below first volume 461 of processing agent 60, second fluid 472 in elongated portion 482 may exert a body force on first volume 461 of processing agent 60 since second fluid 472 rises within elongated portion 482 to a height $H_5$ gravitationally above first volume 461 disposed in processing portion 484. The body force may be exerted on first volume 461 of processing agent 60 via second fluid 472 of transition volume 481 disposed in transition portion 480. The body force may be exerted by second fluid 472 on processing agent 60 as second fluid 472 pushes gravitationally upward (i.e., opposite the direction G of gravitational acceleration) against processing agent 60 (e.g., at fluid interface 486 when second fluid 472 has a greater density than processing agent 60). The gravitational body force exerted on processing agent 60 may prevent or inhibit a phase change and/or excessive evaporation of processing agent 60 during processing of superabrasive element 10. The amount of gravitational body force exerted on the processing agent 60 under standard conditions (e.g., standard temperature and pressure) may be dependent, at least in part, on the density of second fluid 472 and the height $H_5$ of second fluid 472 in elongated portion 482 of processing container 452.

Figure 11:
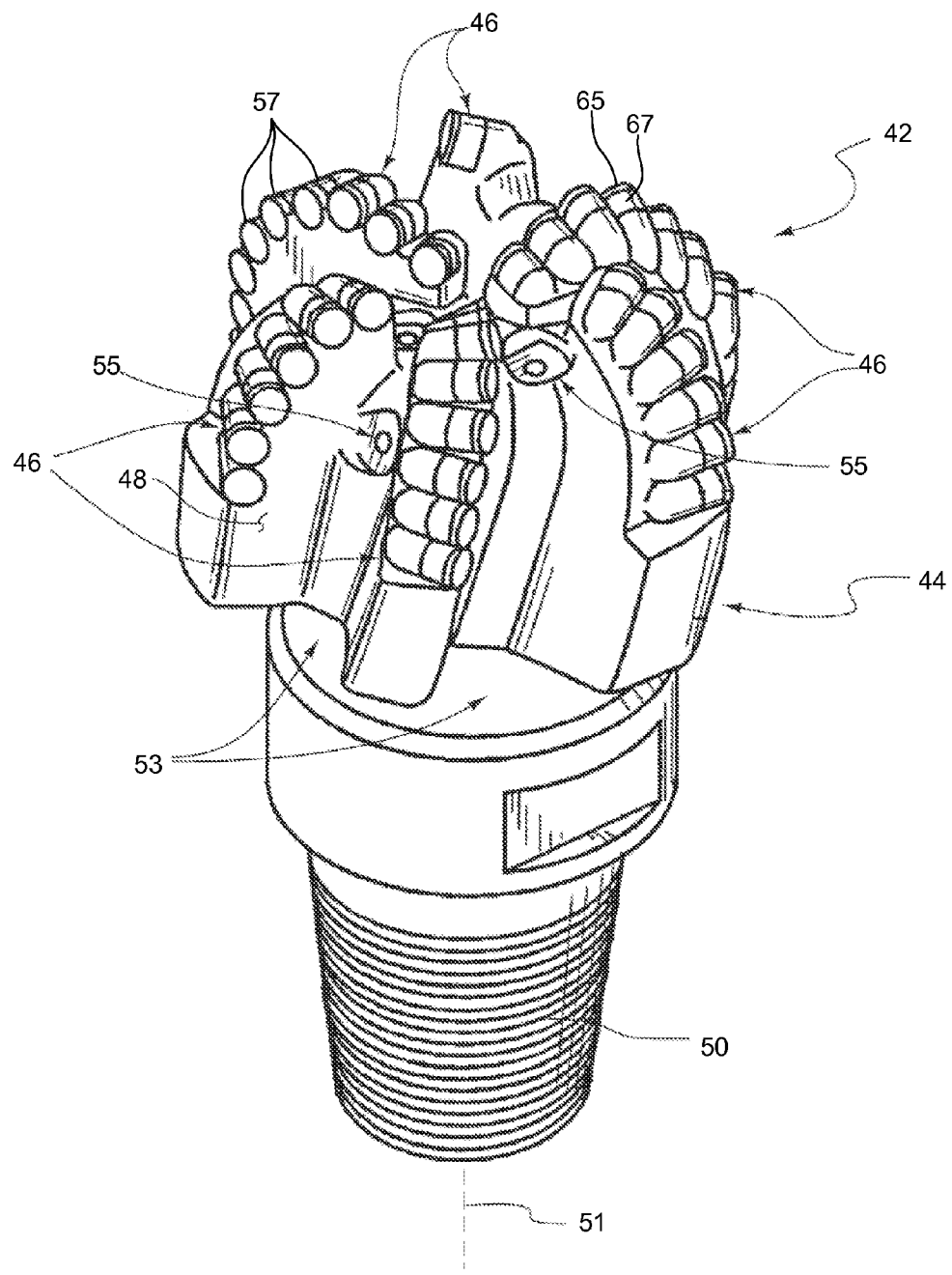
FIG. 11 is a perspective view of an exemplary drill bit according to at least one embodiment.

FIG. 11 is a perspective view of an exemplary drill bit 42 according to at least one embodiment. Drill bit 42 may represent any type or form of earth-boring or drilling tool, including, for example, a rotary drill bit.

As illustrated in FIG. 11, drill bit 42 may comprise a bit body 44 having a longitudinal axis 51. Bit body 44 may define a leading end structure for drilling into a subterranean formation by rotating bit body 44 about longitudinal axis 51 and applying weight to bit body 44. Bit body 44 may include radially and longitudinally extending blades 46 with leading faces 48 and a threaded pin connection 50 for connecting bit body 44 to a drill string.

At least one cutting element 57 may be coupled to bit body 44. For example, as shown in FIG. 11, a plurality of cutting elements 57 may be coupled to blades 46. Cutting elements 57 may comprise any suitable superabrasive cutting elements, without limitation. In at least one embodiment, cutting elements 57 may be configured according to previously described superabrasive element 10 and/or superabrasive disc 28. For example, each cutting element 57 may include a superabrasive table 65, such as a PCD table, bonded to a substrate 67.

Circumferentially adjacent blades 46 may define so-called junk slots 53 therebetween. Junk slots 53 may be configured to channel debris, such as rock or formation cuttings, away from cutting elements 57 during drilling. Rotary drill bit 42 may also include a plurality of nozzle cavities 55 for communicating drilling fluid from the interior of rotary drill bit 42 to cutting elements 57.

FIG. 11 depicts an example of a rotary drill bit 42 that employs at least one cutting element 57 comprising a superabrasive table 65 fabricated, structured, or processed in accordance with the disclosed embodiments, without limitation. Rotary drill bit 42 may additionally represent any number of earth-boring tools or drilling tools, including, for example, core bits, roller-cone bits, fixed-cutter bits, eccentric bits, bicenter bits, reamers, reamer wings, or any other downhole tool including superabrasive cutting elements and discs, without limitation.

The superabrasive elements and discs disclosed herein may also be utilized in applications other than cutting technology. For example, embodiments of superabrasive elements disclosed herein may also form all or part of heat sinks, wire dies, bearing elements, cutting elements, cutting inserts (e.g., on a roller cone type drill bit), machining inserts, or any other article of manufacture as known in the art. Thus, superabrasive elements and discs, as disclosed herein, may be employed in any suitable article of manufacture that includes a superabrasive element, disc, or layer. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. For an example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements as disclosed herein.

Figure 12:
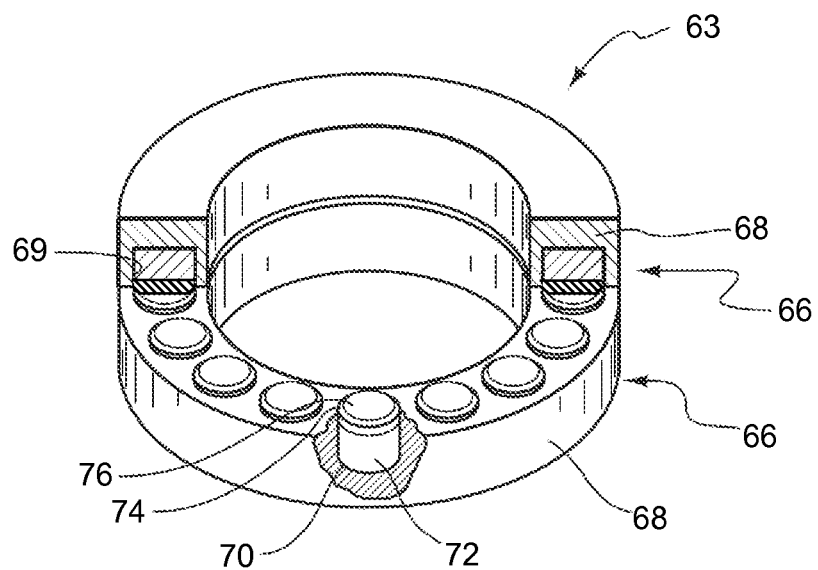
FIG. 12 is a partial cut-away perspective view of an exemplary thrust bearing apparatus according to at least one embodiment.

FIG. 12 is partial cross-sectional perspective view of an exemplary thrust-bearing apparatus 63 according to at least one embodiment. Thrust-bearing apparatus 63 may utilize any of the disclosed superabrasive element embodiments (e.g., superabrasive elements processed according to the instant disclosure) as bearing elements 70. Thrust-bearing apparatus 63 may also include bearing assemblies 66. Each bearing assembly 66 may include a support ring 68 fabricated from a material, such as steel, stainless steel, or any other suitable material, without limitation.

Each support ring 68 may include a plurality of recesses 69 configured to receive corresponding bearing elements 70. Each bearing element 70 may be mounted to a corresponding support ring 68 within a corresponding recess 69 by brazing, welding, press-fitting, using fasteners, or any another suitable mounting technique, without limitation. One or more of bearing elements 70 may be configured in accordance with any of the disclosed superabrasive element embodiments. For example, each bearing element 70 may include a substrate 72 and a superabrasive table 74 comprising a PCD material. Each superabrasive table 74 may form a bearing surface 76.

Bearing surfaces 76 of one bearing assembly 66 may bear against opposing bearing surfaces 76 of a corresponding bearing assembly 66 in thrust-bearing apparatus 63, as illustrated in FIG. 12. For example, a first bearing assembly 66 of thrust-bearing apparatus 63 may be termed a "rotor." The rotor may be operably coupled to a rotational shaft. A second bearing assembly 66 of thrust-bearing apparatus 63 may be held substantially stationary relative to the first bearing assembly 66 and may be termed a "stator."

Figure 13:
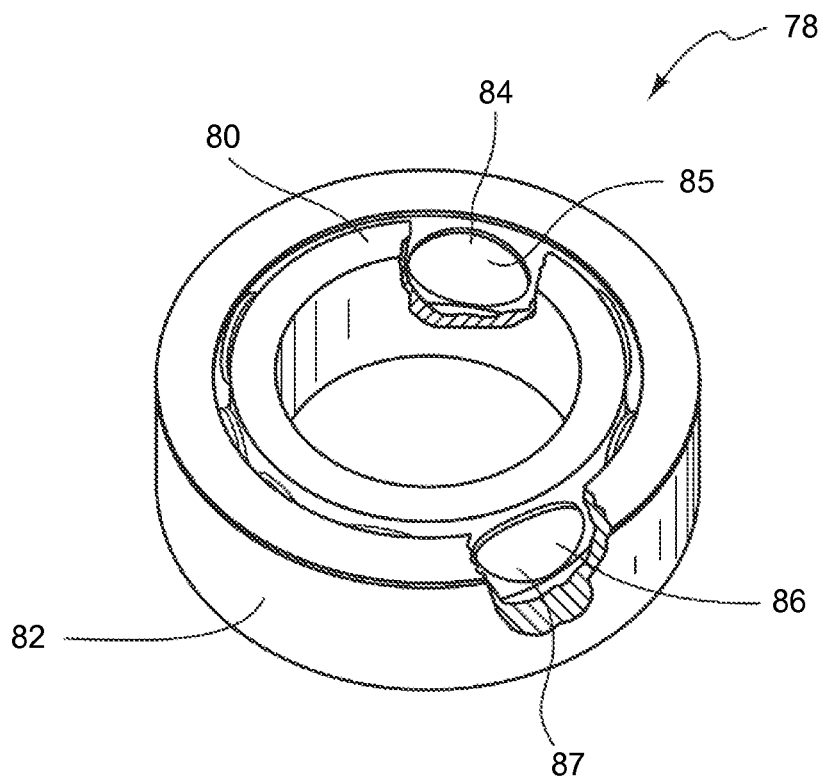
FIG. 13 is a partial cut-away perspective view of an exemplary radial bearing apparatus according to at least one embodiment.

FIG. 13 is a partial cross-sectional perspective view of a radial bearing apparatus 78 according to another embodiment. Radial bearing apparatus 78 may utilize any of the disclosed superabrasive element embodiments (e.g., superabrasive elements processed according to the instant disclosure) as bearing elements 84 and 86. Radial bearing apparatus 78 may include an inner race 80 positioned generally within an outer race 82. Inner race 80 may include a plurality of bearing elements 84 affixed thereto, and outer race 80 may include a plurality of corresponding bearing elements 86 affixed thereto. One or more of bearing elements 84 and 86 may be configured in accordance with any of the superabrasive element embodiments disclosed herein.

Inner race 80 may be positioned generally within outer race 82. Thus, inner race 80 and outer race 82 may be configured such that bearing surfaces 85 defined by bearing elements 84 and bearing surfaces 87 defined by bearing elements 86 may at least partially contact one another and move relative to one another as inner race 80 and outer race 82 rotate relative to each other. According to various embodiments, thrust-bearing apparatus 63 and/or radial bearing apparatus 78 may be incorporated into a subterranean drilling system.

Figure 14:
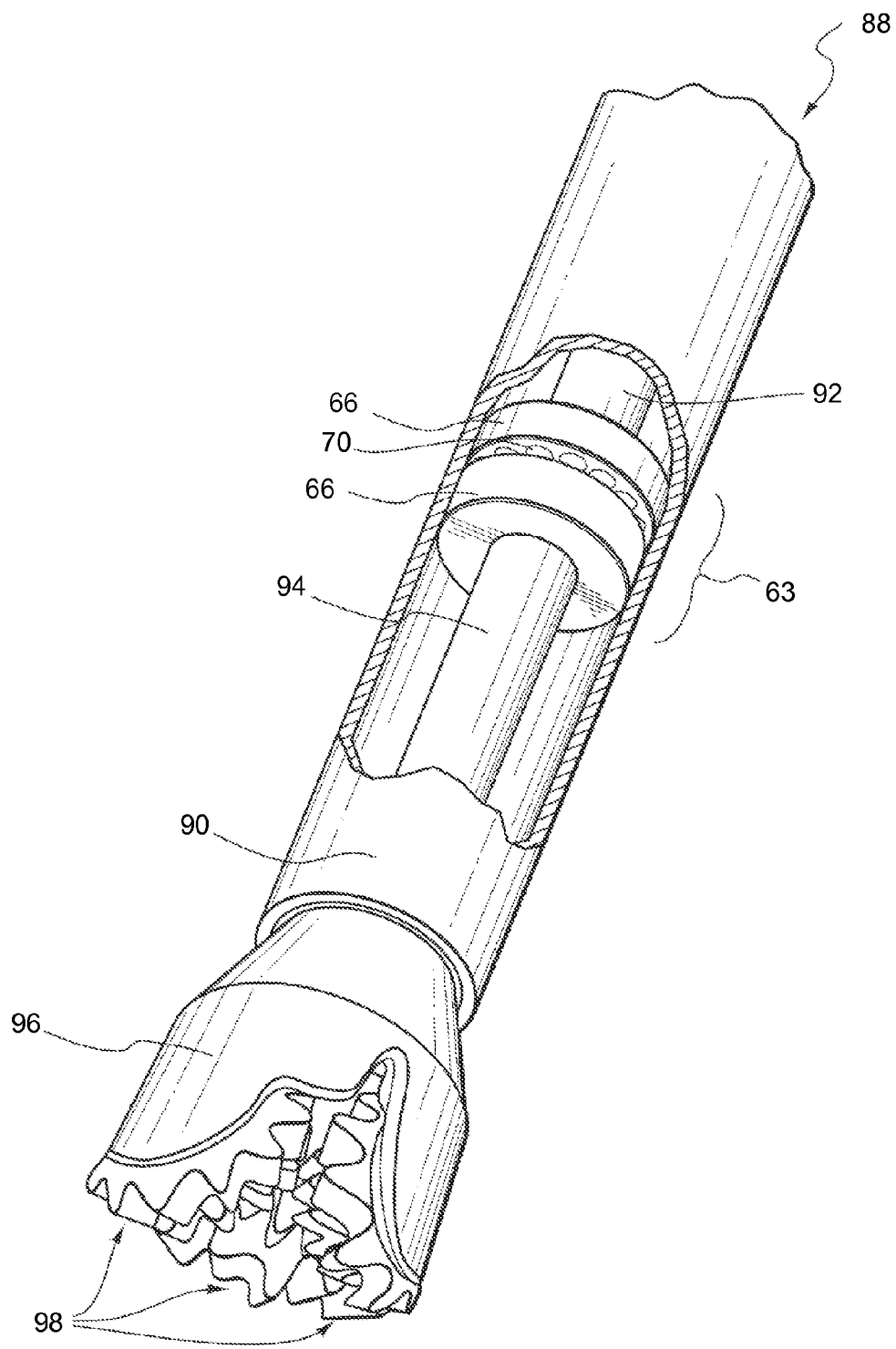
FIG. 14 is a partial cut-away perspective view of an exemplary subterranean drilling system according to at least one embodiment.

FIG. 14 is a partial cross-sectional perspective view of an exemplary subterranean drilling system 88 that includes a thrust-bearing apparatus 63, as shown in FIG. 12, according to at least one embodiment. Subterranean drilling system 88 may include a housing 90 enclosing a downhole drilling motor 92 (i.e., a motor, turbine, or any other suitable device capable of rotating an output shaft, without limitation) that is operably connected to an output shaft 94.

The thrust-bearing apparatus 63 shown in FIG. 12 may be operably coupled to downhole drilling motor 92. A rotary drill bit 96, such as a rotary drill bit configured to engage a subterranean formation and drill a borehole, may be connected to output shaft 94. As illustrated in FIG. 14, rotary drill bit 96 may be a roller cone bit comprising a plurality of roller cones 98. According to additional embodiments, rotary drill bit 96 may comprise any suitable type of rotary drill bit, such as, for example, a so-called fixed-cutter drill bit. As a borehole is drilled using rotary drill bit 96, pipe sections may be connected to subterranean drilling system 88 to form a drill string capable of progressively drilling the borehole to a greater depth within a subterranean formation.

A first thrust-bearing assembly 66 in thrust-bearing apparatus 63 may be configured as a rotor that is attached to output shaft 94 and a second thrust-bearing assembly 66 in thrust-bearing apparatus 63 may be configured as a stator. During a drilling operation using subterranean drilling system 88, the rotor may rotate in conjunction with output shaft 94 and the stator may remain substantially stationary relative to the rotor.

According to various embodiments, drilling fluid may be circulated through downhole drilling motor 92 to generate torque and effect rotation of output shaft 94 and rotary drill bit 96 attached thereto so that a borehole may be drilled. A portion of the drilling fluid may also be used to lubricate opposing bearing surfaces of bearing elements 70 on thrust-bearing assemblies 66.

Figure 15:
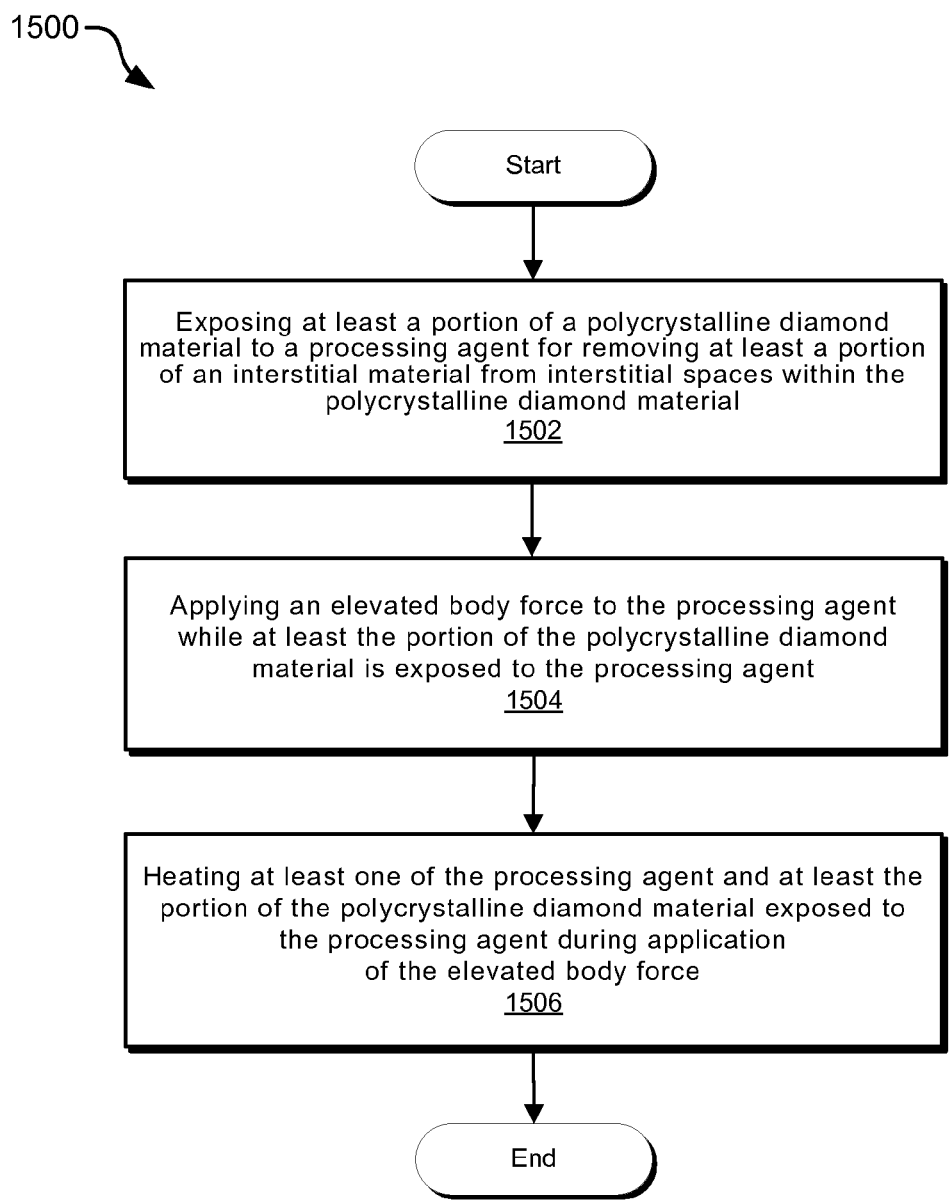
FIG. 15 is a flow diagram of an exemplary method of processing a polycrystalline superabrasive material according to at least one embodiment.

FIG. 15 illustrates an exemplary method 1500 for processing a polycrystalline diamond material according to at least one embodiment. As shown in FIG. 15, the method for processing a polycrystalline diamond material may include exposing at least a portion of the polycrystalline diamond material to a processing agent for removing at least a portion of an interstitial material from interstitial spaces within the polycrystalline diamond material (step 1502).

The polycrystalline diamond material may be exposed to the processing agent in any suitable manner, such as, for example, by submerging at least a portion of the polycrystalline diamond material in the processing agent.

A polycrystalline diamond material may comprise at least a portion of any suitable polycrystalline diamond article. For example, the polycrystalline material may comprise a superabrasive table attached to a tungsten carbide substrate in a superabrasive element or a superabrasive disc (e.g., superabrasive element 10 and superabrasive disc 28 in FIGS. 1 and 2, respectively). The polycrystalline diamond material may include bonded diamond grains and interstitial regions between the bonded diamond grains (e.g., grains 32 and interstitial regions 34 in FIG. 4). Additionally, the interstitial material may be a metal-solvent catalyst, such as cobalt, nickel, iron, and/or any suitable group VIII element, may be disposed in at least some of the interstitial regions between the bonded diamond grains.

In some embodiments, the processing agent may comprise a leaching agent that removes at least a portion of an interstitial material from the polycrystalline diamond material to form a volume in the polycrystalline diamond material from which an interstitial material has been substantially removed (e.g., first volume 30 in FIG. 3A).

In various embodiments, the volume of processing agent may comprise a cleaning agent for cleaning the polycrystalline diamond material. Generally, such a cleaning agent may be utilized for removing an interstitial material from the polycrystalline diamond material. For example, following leaching, a leaching agent and compounds (e.g., dissolved therein) or other interstitial materials may be removed from a polycrystalline diamond material after a leaching process by exposing at least a portion of the polycrystalline diamond material to a cleaning agent. Such a cleaning agent may include any material suitable for removing the leaching agent and/or other compounds from interstitial spaces within the polycrystalline diamond material. The polycrystalline diamond material may be exposed to the cleaning agent in any suitable manner, such as, for example, by submerging at least a portion of the polycrystalline diamond material in the cleaning agent.

The method may further include applying a body force to the processing agent while at least the portion of the polycrystalline diamond material is exposed to the processing agent (step 1504). The body force may be applied to the processing agent in any suitable manner. For example, a centrifugal body force may be exerted on the processing agent as the polycrystalline diamond material and processing agent are rotated at high speed in a centrifuge. Additionally, a gravitational body force may be exerted on processing agent by, for example, a second volume of fluid. The second volume of fluid may comprise, for example, the processing agent and/or another fluid composition having the same or different density than the processing agent.

The method may additionally include heating at least one of the processing agent and at least the portion of polycrystalline diamond material exposed to the processing agent during application of the elevated body force (step 1506). At least a portion of superabrasive element 10 and processing agent 60 may exhibit a temperature that is close to, at, below, or above a phase change temperature of the processing agent 60 under standard conditions (e.g., standard temperature and pressure). According to some embodiments, depending on the type of processing agent 60 used, processing agent 60 and/or superabrasive element 10 may be heated to temperatures greater than approximately 50° C. For example, processing agent 60 and/or superabrasive element 10 may be heated to temperatures ranging from approximately 50° C. up to, or in excess of 500° C. (e.g., approximately 60° C., 70° C., 80° C., 90° C., 100° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., 500° C.).

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond material, the method comprising:
   exposing at least a portion of a polycrystalline diamond material to a processing agent for removing at least a portion of an interstitial material;
   applying an elevated body force to the processing agent while at least the portion of the polycrystalline diamond material is exposed to the processing agent, the body force comprising at least one of a gravitational body force and a centrifugal body force;
   heating at least one of the processing agent and at least the portion of the polycrystalline diamond material exposed to the processing agent during application of the elevated body force.

2. The method of claim 1, wherein the processing agent comprises a leaching agent for leaching a metallic material from interstitial spaces within at least the portion of the polycrystalline diamond material.

3. The method of claim 1, wherein the processing agent comprises a cleaning agent for cleaning at least the portion of the polycrystalline diamond material.

4. The method of claim 1, wherein:
   the processing agent comprises a liquid solution;
   the elevated body force is sufficient to prevent a phase change of the liquid solution during heating.

5. The assembly of claim 1, wherein the heating comprises a heating to a temperature greater than a temperature required for a phase change of the liquid solution under atmospheric conditions.

6. The method of claim 1, wherein applying the elevated body force comprises rotating the processing agent and the polycrystalline diamond material about a rotational axis.

7. The method of claim 1, wherein applying the elevated body force comprises disposing another fluid gravitationally above the processing agent.

8. The method of claim 7, wherein the other fluid has a density greater than the density of the processing agent.

9. The method of claim 7, wherein:
the polycrystalline diamond material, the processing agent, and the other fluid are disposed within a container;
the other fluid has a height within the container greater than a height of the processing agent within the container.

10. The method of claim 7, wherein the other fluid contacts the processing agent.

11. The method of claim 7, wherein the other fluid is open to atmospheric surroundings.

12. The method of claim 1, further comprising disposing a protective barrier around a portion of the polycrystalline diamond material.

13. The method of claim 1, wherein the polycrystalline diamond material comprises a polycrystalline diamond body bonded to a substrate.

14. An assembly for processing a polycrystalline diamond body, the assembly comprising:
a processing container;
at least one polycrystalline diamond body disposed in the processing container;
a volume of processing agent disposed in the processing container, at least a portion of the polycrystalline diamond body being exposed to the processing agent, the processing agent processing at least a portion of the polycrystalline diamond body;
a body force application portion for applying an elevated body force to the processing agent while at least the portion of the polycrystalline diamond body is exposed to the processing agent, the body force comprising at least one of a gravitational body force and a centrifugal body force;
a heating element for increasing a temperature of at least one of the processing agent and at least the portion of the polycrystalline diamond body exposed to the processing agent during application of the elevated body force to the processing agent.

15. The assembly of claim 14, wherein:
the processing agent comprises a liquid solution;
the elevated body force is sufficient to prevent a phase change of the liquid solution during heating.

16. The assembly of claim 14, wherein the body force application portion comprises a centrifugal device for rotating the processing container about a rotational axis.

17. The assembly of claim 14, wherein the body force application portion comprises a fluid conduit containing another fluid disposed gravitationally above the processing agent.

18. The assembly of claim 17, wherein the fluid conduit extends in a vertical direction.

19. The assembly of claim 17, wherein the other fluid has a density greater than the density of the processing agent.

20. The assembly of claim 17, wherein the other fluid has a height within the fluid conduit greater than a height of the processing agent within the fluid conduit.

21. The assembly of claim 17, wherein an end of the fluid conduit disposed apart from the processing container comprises an opening such that the other fluid is open to atmospheric surroundings.

22. The assembly of claim 14, further comprising a protective barrier disposed around a portion of the polycrystalline diamond body.

* * * * *